United States Patent
Gutierrez et al.

(10) Patent No.: US 11,182,962 B2
(45) Date of Patent: Nov. 23, 2021

(54) METHOD AND SYSTEM FOR OBJECT SEGMENTATION IN A MIXED REALITY ENVIRONMENT

(71) Applicant: Logitech Europe S.A., Lausanne (CH)

(72) Inventors: Mario Gutierrez, Renens (CH); Thomas Rouvinez, Evionnaz (CH); Sidney Bovet, Lausanne (CH); Helmut Grabner, Bonstetten (CH); Mathieu Meisser, La Conversion (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/267,197

(22) Filed: Feb. 4, 2019

(65) Prior Publication Data

US 2019/0295322 A1    Sep. 26, 2019

Related U.S. Application Data

(60) Provisional application No. 62/645,760, filed on Mar. 20, 2018.

(51) Int. Cl.
*G06T 19/00*    (2011.01)
*G02B 27/01*    (2006.01)
(Continued)

(52) U.S. Cl.
CPC .......... *G06T 19/006* (2013.01); *G02B 27/017* (2013.01); *G02B 27/0179* (2013.01);
(Continued)

(58) Field of Classification Search
None
See application file for complete search history.

(56) References Cited

U.S. PATENT DOCUMENTS

| 9,557,825 | B2* | 1/2017 | Nakura-Fan | G06F 3/023 |
| 2012/0227006 | A1* | 9/2012 | Amm | G06F 1/169 |
| | | | | 715/773 |

(Continued)

OTHER PUBLICATIONS

Cosco et al.; "Visuo-Haptic Mixed Reality with Unobstructed Tool-Hand Integration;" Jan. 2013; IEEE Transactions on Visualization and Computer Graphics, vol. 19, No. 1. pp. 159-172. (Year: 2013).*

(Continued)

*Primary Examiner* — Peter Hoang
(74) *Attorney, Agent, or Firm* — Kilpatrick Townsend & Stockton LLP

(57) ABSTRACT

Methods and systems for providing a mixed reality (MR) interaction are provided. In one example, the method comprises: capturing a first image of a user's appendage and a physical peripheral input device, wherein the user's appendage covers at least a part of the physical peripheral input device; performing a segmentation of the first image into a first region of pixels corresponding to the user's appendage, wherein a second region of pixels corresponds to the physical peripheral input device; generating a composite image from the first image based on rendering, in place of the second region of pixels, pixels representing a virtual peripheral input device, such that the virtual peripheral input device appears in the composite image as at a same spatial location as the physical peripheral input device and covered at least partially by the user's appendage; and displaying the composite image to the user.

20 Claims, 22 Drawing Sheets

(51) Int. Cl.
*G06F 3/01* (2006.01)
*G06F 3/0481* (2013.01)
*G06T 7/11* (2017.01)
*G06T 7/70* (2017.01)
*G06T 15/60* (2006.01)

(52) U.S. Cl.
CPC .......... *G06F 3/011* (2013.01); *G06F 3/04815* (2013.01); *G06T 7/11* (2017.01); *G06T 7/70* (2017.01); *G06T 15/60* (2013.01); *G02B 2027/0138* (2013.01); *G02B 2027/0187* (2013.01)

(56) References Cited

U.S. PATENT DOCUMENTS

| | | | |
|---|---|---|---|
| 2014/0204002 A1* | 7/2014 | Bennet | G06F 3/011 345/8 |
| 2015/0160724 A1* | 6/2015 | Hawkins | G06F 3/017 345/156 |
| 2018/0033204 A1* | 2/2018 | Dimitrov | G06T 15/20 |
| 2018/0239510 A1* | 8/2018 | Green | G06F 3/0488 |

OTHER PUBLICATIONS

Abate et al., "An Image Based Approach to Hand Occlusions in Mixed Reality Environments;" 2014 In: Shumaker R., Lackey S. (eds) Virtual, Augmented and Mixed Reality. Designing and Developing Virtual and Augmented Environments. VAMR 2014. pp. 319-328 (Year: 2014).*

* cited by examiner

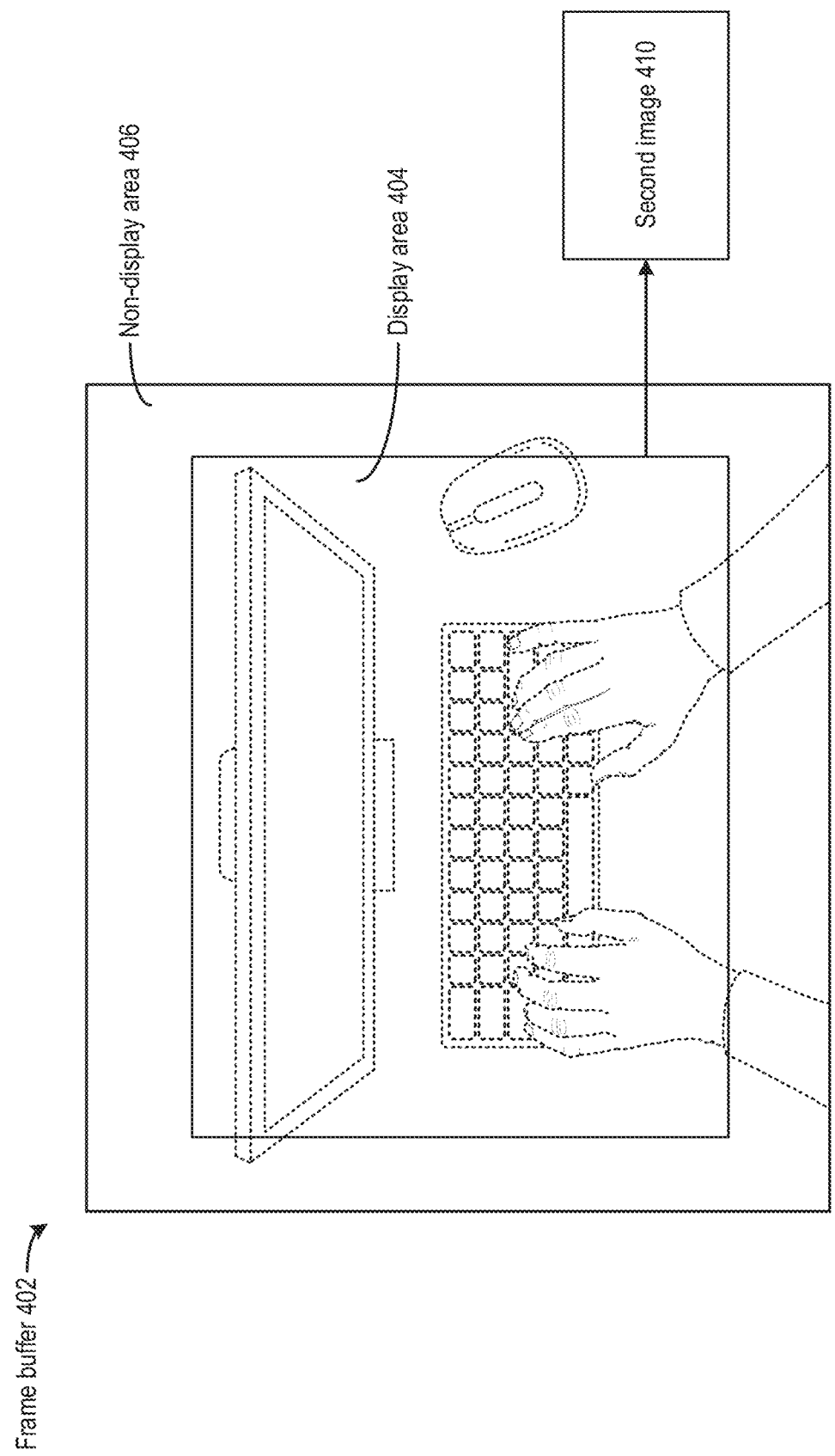

METHOD AND SYSTEM FOR OBJECT SEGMENTATION IN A MIXED REALITY ENVIRONMENT

CROSS-REFERENCES TO RELATED APPLICATIONS

This application is a non-provisional application and claims the benefit and priority of U.S. Provisional Application No. 62/645,760, filed on Mar. 20, 2018, and titled "ACCURATE HAND TRACKING ON A PERIPHERAL DEVICE IN A MIXED REALITY ENVIRONMENT," which is hereby incorporated by reference in its entirety for all purposes.

The following regular U.S. patent application (including this one) is being filed concurrently, and the entire disclosure of the other application is incorporated by reference into this application for all purposes:

application Ser. No. 16/267,200, filed Feb. 4, 2019, entitled "METHOD AND SYSTEM FOR MIXED REALITY INTERACTION WITH PERIPHERAL DEVICE";

BACKGROUND

Peripheral devices can be used to interface human and computer. Some common peripheral devices include keyboards, computer mice, image scanners, speakers, microphones, web cameras, a head mounted display (HMD), styli, pens, pointer devices, and more. Some of these peripheral devices can interoperate to improve user experience. For example, an HMD can operate with other peripheral devices (e.g., a mouse, a keyboard, etc.) to provide mixed reality (MR) or augmented reality (AR) experience. For example, an HMD worn by a user can include cameras to capture real-time images of a user's interaction with another peripheral device (e.g., a keyboard) in front of the user. A composite image can be generated by combining a reality element (e.g., a physical hand or other body parts, a physical keyboard, etc.) from the images with a virtual element (e.g., a virtual keyboard, a virtual hand, etc.). A composite image can be generated for each of the real-time images, and the composite images can be displayed to the user at the HMD in lieu of the real-time images.

When the HMD moves due to the user's movement, the composite image displayed in the HMD can be updated to reflect the change in the viewing angle of the user with respect to the peripheral device. The rendering of the virtual element and real elements in the composite image should be in sync with the movement of the HMD, to improve consistency and to mitigate motion sickness experiences.

BRIEF SUMMARY

In certain embodiments, a method of providing a mixed reality (MR) interaction is provided. The method comprises: capturing, at a first time and using a camera of a head-mounted display (HMD) of a user, a first image of a physical interaction of the user with a physical object; measuring a movement of the HMD with respect to the physical object between the first time and a second time; processing the first image based on the measurement of the movement of the HMD to generate a second image; generating, based on the second image, a composite image of a virtual interaction involving the user; and displaying, via the HMD and based on the composite image, the virtual interaction in place of the physical interaction to the user at the second time.

In some aspects, the first image is captured at a first time. The method further comprises: measuring the movement of the HMD with respect to the physical object between the first time and the second time to obtain one or more measurement results; and processing the first image based on the one or more measurement results to generate the second image.

In some aspects, processing the first image based on the one or more measurement results to generate the second image comprises: storing the first image in a frame buffer; shifting a portion of the first image in the frame buffer based on the one or more measurement results; and generating the second image based on the shifted portion of the first image.

In some aspects, the frame buffer comprises a first buffer area and a second buffer area. The data of the first image is divided between the first buffer area and the second buffer area. The second image is generated based on part of the data of the first image stored in the first buffer area. Shifting the portion of the first image in the frame buffer comprises changing a location of the first buffer area within the frame buffer.

In some aspects, the frame buffer comprises a first buffer area and a second buffer area. Data of the first image can be divided between the first buffer area and the second buffer area. The second image can be generated based on part of the data of the first image stored in the first buffer area. Shifting the portion of the first image in the frame buffer may include changing storage locations of the data of the first image with respect to a location of the first buffer area within the frame buffer.

In some aspects, the one or more measurement results comprise: an angular speed of the HMD and a direction of rotation of the HMD.

In some aspects, shifting a portion of the first image in the frame buffer based on the one or more measurement results comprises: determining a rotational angle based on the angular speed, the direction of rotation, and a time difference between the first time and the second time; determining a shift distance and a shift direction based on the rotational angle, a first location of the HMD and a second location of the physical object; and shifting the portion of the first image in the frame buffer based on the shift distance and the shift direction.

In some aspects, the method further comprises: determining the time difference based on estimating a delay between the first time and the second time.

In some aspects, the first image comprises an image of a display device that displays a time-varying pattern. The method further comprises: identifying, from the first image, the pattern; and determining the first time based on the identified pattern.

In some aspects, the first image comprises a time-varying light pattern emitted by the physical object. The method further comprises: identifying, from the first image, the light pattern; and determining the first time based on the identified light pattern.

In some aspects, the first time is determined based on determining a time when a shutter of the camera of the HMD opens.

In some aspects, the second time is determined based on determining a time when the first image is stored in the frame buffer.

In some aspects, the second location of the physical object is determined based on information received from an optical sensor attached to the physical object.

In some aspects, the second location of the physical object is determined based on information received from an optical sensor that receives light from a light emitter attached to the physical object.

In some aspects, the first location of the HMD is determined based on detecting directional light beams from a plurality of light emitters and pre-determined locations of the plurality of light emitters.

In some aspects, the composite image is generated based on: determining an image location of the physical object in the second image based on a location of the HMD, a location of the physical object, and the one or more measurement results; and replacing pixels corresponding to the physical object in the second image at the image location with pixels of a virtual object to generate the composite image.

In some aspects, the composite image is generated based on: determining a first image location of the physical object in the second image based on a location of the HMD, a location of the physical object, and the one or more measurement results; determining, based on the first image location and in the second image, a second image location of the user's body part involved in the physical interaction with the physical object; extracting pixels of the user's body part at a second image location in the second image; and placing the pixels of the user's body part in the composite image.

In some aspects, the user's body part comprises at least a part of a hand of the user.

In certain embodiments, an apparatus is provided. The apparatus comprises: a display device; a camera configured to capture, at a first time, a first image of a physical interaction of a user with a physical object; and an image processor coupled with the camera and with the display device and configured to: measure a movement of the apparatus with respect to the physical object between the first time and a second time; process the first image based on the measurement of the movement of the apparatus to generate a second image; generate, based on the second image, a composite image of a virtual interaction involving the user; and provide the composite image to the display device for displaying the virtual interaction in place of the physical interaction to the user at the second time.

In certain embodiments, a non-transitory computer readable medium is provided. The non-transitory computer readable medium stores instructions that, when executed by a hardware processor, causes the hardware processor to: receive, from a camera of a head-mounted display (HMD), a first image of a physical interaction of a user with a physical object, the first image being captured by the camera at a first time; measure a movement of the HMD with respect to the physical object between the first time and a second time; process the first image based on the measurement of the movement of the HMD to generate a second image; generate, based on the second image, a composite image of a virtual interaction involving the user; and provide the composite image to a display device for displaying the virtual interaction in place of the physical interaction to the user at the second time.

In certain embodiments, a method for providing a mixed reality (MR) interaction ios provided. The method comprises: capturing a first image of a user's appendage and a physical peripheral input device, wherein the user's appendage covers at least a part of the physical peripheral input device; performing a segmentation of the first image into a first region of pixels corresponding to the user's appendage, wherein a second region of pixels corresponds to the physical peripheral input device; generating a composite image from the first image based on rendering, in place of the second region of pixels, pixels representing a virtual peripheral input device, such that the virtual peripheral input device appears in the composite image as at a same spatial location as the physical peripheral input device and covered at least partially by the user's appendage; and displaying the composite image to the user.

In some aspects, the composite image is displayed to the user at substantially the same time as when the user's appendage covers the at least a part of the physical peripheral input device.

In some aspects, the segmentation of the first image is performed based on a distribution of activities at a plurality of locations of the physical peripheral input device.

In some aspects, the segmentation of the first image comprises: determining a historical distribution of the activities at the plurality of locations of the physical peripheral input device, the historical distribution of the activities being based on prior interactions between the user or a group of users with the physical peripheral input device; determining one or more thresholds based on the historical distribution of the activities; comparing the pixels of the first image against the one or more thresholds; and determining the first region of pixels corresponding to the user's appendage and the second region of pixels corresponding to the physical peripheral input device based on results of the comparison.

In some aspects, the segmentation of the first image comprises: determining, based on statistical analysis of the historical distribution of the activities, a distribution of likelihoods of the user's appendage being at each location of the plurality of locations of the physical peripheral input device; identifying, based on the distribution of likelihoods, pixels that are likely to be part of the user's appendage; and determining the one or more thresholds based on one or more attributes of the identified pixels.

In some aspects, the method further comprises: determining a first threshold of the one or more thresholds corresponding to a first region of the user's appendage; determining a second threshold of the one or more thresholds corresponding to a second region of the user's appendage; and comparing the pixels of the first image against the first threshold and the second threshold to determine the first region of pixels corresponding to the user's appendage.

In some aspects, the method further comprises: determining at least one of the first threshold or the second threshold based on at least one of: an ambient light intensity, or an identity of the user.

In some aspects, the distribution of activities comprises an instantaneous distribution of activities at the plurality of locations of the physical peripheral input device.

In some aspects, the method further comprises: receiving, from a sensor at a first location of the physical peripheral input device, an indication of receiving an activity; based on the indication, capturing a third image of the physical peripheral input device; selecting a third region of pixels corresponding to the first location and a fourth region of pixels around the first location; determining a first histogram of color components for the third region of pixels; determining a second histogram of color components for the fourth region of pixels; determining one or more thresholds based on the first histogram and the second histogram; and comparing pixels of the first image against the one or more thresholds to determine the first region of pixels of the first image corresponding to the user's appendage.

In some aspects, the method further comprises: identifying, based on a historical distribution of activities, a second location of the physical peripheral input device that receives fewer than a pre-determined number of prior activities; identifying, from the third image, a fifth region of pixels corresponding to the second location; determining a third histogram of color components for the fifth region of pixels; determining a second threshold of the one or more thresholds based on the third histogram; and comparing the pixels of the first image against the second threshold to determine the second region of pixels of the first image corresponding to the physical keyboard.

In some aspects, the method further comprises: determining a change in the distribution of the activities with respect to time; determining a region of interest based on the change; identifying pixels in the region of interest of the first image; and determining the first region of pixels corresponding to the user's appendage from the identified pixels.

In some aspects, the method further comprises: capturing a second image of the physical peripheral input device unoccluded by the user's appendage; determining one or more thresholds based on the second image; transmitting an indication to the user to put the user's appendage at pre-determined locations of the physical peripheral input device; capturing a third image of the user's appendage at the pre-determined locations of the physical peripheral input device; adjusting the one or more thresholds based on pixels of the third image corresponding to the pre-determined locations of the physical keyboard; and comparing the pixels of the first image against the adjusted one or more thresholds to determine the first region of pixels corresponding to the user's appendage.

In some aspects, the distribution of the activities is determined from a plurality of distributions of activities based on at least one of: a model of the physical peripheral input device, or an application for which the user interacts with the physical peripheral input device.

In some aspects, the composite image is generated based on replacing pixels corresponding to a physical environment in which the physical peripheral input device is located with pixels representing a virtual environment in which the virtual peripheral input device is located.

In some aspects, the composite image is generated based on adjusting a luminance of the first region of pixels based on a luminance of the virtual environment.

In some aspects, the composite image is generated based on: adding a virtual shadow in the virtual environment cast by the user's appendage.

In some aspects, the first image is captured by a camera of a head mounted display (HMD). The composite image is displayed by the HMD.

In some aspects, the segmentation of the first image into the first region of pixels corresponding to the user's appendage includes identifying two or more thresholds of pixel values that represent the user's appendage wherein pixels of the first image that do not fall within the two or more thresholds are discarded.

In certain embodiments, an apparatus is provided. The apparatus may include a display device; a camera configured to capture a first image of a user's appendage and a physical peripheral input device, wherein the user's appendage covers at least a part of the physical peripheral input device; and an image processor coupled with the camera and with the display device and configured to: receive the first image from the camera; perform a segmentation of the first image into a first region of pixels corresponding to the user's appendage, wherein a second region of pixels corresponds to the physical peripheral input device; generate a composite image from the first image based on rendering, in place of the second region of pixels, pixels representing a virtual peripheral input device, such that the virtual peripheral input device appears in the composite image as at a same spatial location as the physical peripheral input device and covered at least partially by the user's appendage; and provide the composite image to the display device for displaying to the user.

In some embodiments, a non-transitory computer readable medium is provided. The non-transitory computer readable medium stores instructions that, when executed by a hardware processor, causes the hardware processor to: receive, from a camera, a first image of a user's appendage and a physical peripheral input device, wherein the user's appendage covers at least a part of the physical peripheral input device; perform a segmentation of the first image into a first region of pixels corresponding to the user's appendage, wherein a second region of pixels corresponds to the physical peripheral input device; generate a composite image from the first image based on rendering, in place of the second region of pixels, pixels representing a virtual peripheral input device, such that the virtual peripheral input device appears in the composite image as at a same spatial location as the physical peripheral input device and covered at least partially by the user's appendage; and provide the composite image to a display device for displaying to the user.

BRIEF DESCRIPTION OF THE DRAWINGS

The detailed description is set forth with reference to the accompanying figures.

FIG. 4A-FIG. 4D illustrate examples of an image delay compensation scheme, according to some embodiments.

DETAILED DESCRIPTION

Figure 1A:
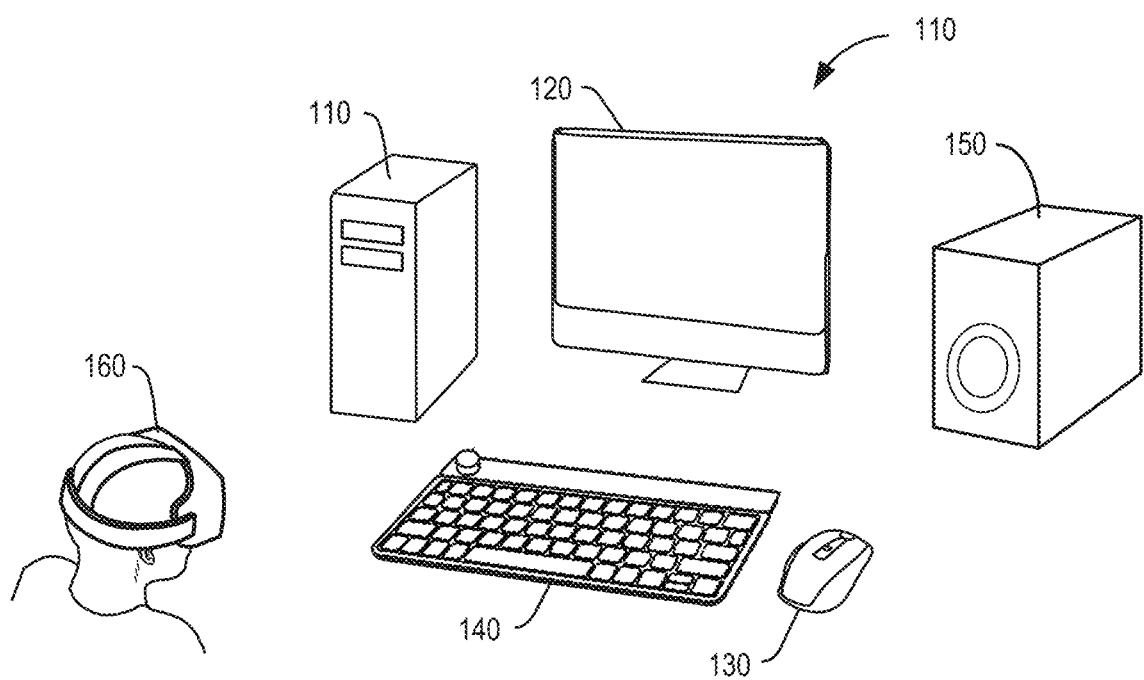
FIG. 1A and FIG. 1B show a typical implementation for a system utilizing the disclosed techniques.

Aspects of the present disclosure relate generally to peripheral devices, and in particular to peripheral devices that provide mixed reality (MR) or augmented reality (AR) interactive experiences, according to certain examples. As used herein, augmented reality (AR) is an interactive experience of a real-world environment. The real-word environment is visible to the user directly with his/her eyes (e.g., via a pair of AR glasses) or is imaged by cameras that align with the line of sights of the user. In AR, the objects that reside in the real-world are augmented by computer-generated perceptual information, sometimes across multiple sensory modalities, including visual, auditory, haptic, somatosensory, and olfactory modalities. Mixed reality (MR), sometimes referred to as hybrid reality, can refer to the merging of real and virtual worlds. In hybrid reality, a fully computer generated environment can be presented which can be merged with images or representations of real objects.

Hybrid reality can produce new environments and visualizations where physical and digital objects co-exist and interact in real time, as well as new user interactions. Mixed reality provides a mixture of reality and virtual reality and can encompass augmented reality via immersive technology.

In the following description, various examples of peripheral devices that provide MR and/or AR interactive experiences will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Peripheral devices can be used to interface human and computer. Some common peripheral devices include keyboards, computer mice, image scanners, speakers, microphones, web cameras, a head-mounted display (HMD), styli, pens, pointer devices, and more. Some of these peripheral devices can detect a motion as an input from a user, and translate the motion as an input to the computer. For example, a handheld peripheral device, such as a computer mouse, can detect its movement relative to a surface, and translate the movement relative to the surface into a corresponding movement of a cursor displayed in a graphical user interface (GUI). Also, the keyboard can detect a motion of a key and/or a tapping motion of a finger at the key, and send a signal to a computer to display certain information represented by the key (e.g., an alphabet, a symbol, a cursor movement, etc.).

Some of these peripheral devices can interoperate to improve user experience. For example, an HMD can operate with other peripheral devices (e.g., a mouse, a keyboard, etc.) to provide a mixed reality (MR) or augmented reality (AR) system. For example, an HMD worn by a user can include cameras to capture real-time images representing a view of a physical environment by the user. To provide an immersive MR/AR experience, real-time images of the user's interaction with another peripheral device (e.g., typing actions on a physical keyboard) can be captured. A first reality element (e.g., a physical hand, or other body part/appendage of a user) shown in the images can be combined with a virtual element representing a second reality element in the physical environment (e.g., a virtual keyboard) to form a composite image. The relative image locations of the first reality element and the virtual element in the composite image can be determined based on, for example, the physical locations of the first reality element and the second reality element with respect to the HMD.

When the HMD moves due to the user's movement (e.g., rotation of the head, nodding of the head, whole body movement of the user, etc.), the composite image displayed in the HMD can be updated to mimic the change in the user's view of the physical environment as the user moves, to improve the immersive interactive experience. For example, in a case where a composite image is generated by placing a virtual keyboard (or other virtual peripheral devices) into the image comprising the hand, the image location of the virtual keyboard can be shifted with respect to the image to account for a new position/orientation of the HMD. Also, in a case where a composite image is generated by extracting hand pixels from the image and placing the hand pixels into a virtual image comprising the virtual keyboard, the extraction location of the hand pixels from the images can also be shifted to account for the new position/orientation of the HMD.

In both cases of composite image generation, the shifting in the image location of the virtual element and the extraction location of the reality element can be based on an assumption that the image reflects the instantaneous position/orientation of the HMD. Such an assumption, however, is not necessarily valid. For example, due to various factors such as video camera latency, render and process delay, data transfer delay, etc., when a image is captured at the time the HMD starts movement, a considerable time delay (e.g., 0.1 second) may have elapsed by the time when the image is available for extraction of the reality element or for combination with the virtual element to form the composite image. Therefore, the image may only reflect a prior position/orientation of the HMD. The latency in the rendering of the image that reflect the latest position/orientation of the HMD is detectable by the user and can degrade user experience. For example, extracting pixels from that image at an image location updated based on the latest position/orientation of the HMD may not yield the expected reality element (e.g., the hand). Moreover, placing the virtual element into that video frame at the updated image location in the composite image may cause misalignment between the reality and virtual elements. For example, at a certain time point the HMD may display a hand on top of and interacting with a virtual keyboard. When the HMD moves, due to the aforementioned misalignment, the HMD may display the hand in a lagging behind position with respect to the virtual keyboard, and the hand is aligned with the virtual keyboard only when the HMD is stationary but not aligned when the HMD is moving. This can lead to an inconsistent interactive experience or even motion sickness.

In addition, as described above, the aforementioned AR/MR system can generate a composite image by extracting hand pixels from the image and placing the hand pixels into a virtual image comprising the virtual keyboard (or other virtual peripheral device). The composite image can be displayed to the user via the HMD when the user is interacting with a physical keyboard represented by the virtual keyboard, to create an interactive AR/MR experience. The quality of the interactive experience may depend on accurate segmentation of the hand in an image that depicts the hand's interaction with the physical keyboard. Hand segmentation can be based on comparing the pixels of the image against one or more thresholds and classifying the pixels as belonging to the hand or the peripheral device (or other background objects) based on the comparison results. The accuracy of the hand segmentation can be affected by various factors including, for example, skin tones, illumination changes, etc. A segmentation scheme that employs one or more fixed thresholds to compare the pixels may work well only for a small range of skin tones and in a small range of environments. To allow the deployment of the AR/MR system in a larger range of settings, which can improve the utility of the system and user experience, a more robust scheme is needed to more accurately distinguish hand pixels from pixels of the background for a wider range of skin tones and in a wider range of environments.

Conceptual Overview of Certain Embodiments

Examples of the present disclosure relate to methods and systems for providing immersive AR/MR experiences and can address some of the challenges described above. According to some embodiments, a method of providing a mixed reality (MR) interaction is provided. The method comprises: capturing, at a first time and using a camera of a head-mounted display (HMD) of a user, a first image of a physical interaction of the user with a peripheral device; measuring a movement of the HMD with respect to the peripheral device between the first time and a second time; processing the first image based on the measurement of the movement of the HMD to generate a second image; generating, based on the second image, a composite image to represent a virtual interaction involving the user; and displaying, via the HMD and based on the composite image, the virtual interaction in place of the physical interaction to the user at the second time. The virtual interaction may include, for example, a virtual interaction between the user's body part and a virtual object representing the peripheral device (e.g., a virtual keyboard), a virtual interaction between a virtual object representing the user's body part (e.g., a virtual hand) and the peripheral device, etc.

More specifically, the first image of the user's physical interaction (e.g., by hands, or by other body parts) with the peripheral device can be captured at the first time prior to the beginning of the HMD movement, but due to processing delay, the first image is not available for composite image generation until the second time, when the HMD has moved over a certain distance or rotated over a certain angle towards a certain direction. Therefore, the first image does not reflect the instantaneous user's view of the interaction with the peripheral device at the second time. Combining a reality element of the physical interaction captured at the first time with a virtual element at a location of the physical interaction viewed by the user at the second time can lead to misalignment between the reality element and the virtual element. As an illustrative example, the HMD may capture an image of a physical interaction between a user's fingers and a keyboard, and may generate a composite image depicting a virtual interaction between the user's fingers and a virtual keyboard. When the HMD moves, due to the aforementioned misalignment, the HMD may display the user's fingers as disconnected or offset from with the virtual keyboard, and the fingers may be correctly aligned with the virtual keyboard only when the HMD is stationary. This can lead to an inconsistent interactive experience (e.g., degraded performance in typing on a virtual keyboard) or even motion sickness.

To reduce the misalignment, the first image can be processed based on a measurement of the movement of the HMD to generate a second image, and the second image can be used to generate the composite image. The processing may include shifting a portion of the first image to generate the second image. The second image can represent a view of the interaction captured by the camera of the HMD at the second time. In some examples, the shifting of the portion of the first image can be performed at a frame buffer that stores the first image. The frame buffer can be divided into a display area and a non-display area. Image data stored at the display area are provided for composite image generation and/or for display, while image data stored at the non-display area are not provided for composite image generation or for display. The location of the display area in the frame buffer can be shifted to select a different portion of the image data for display, which can create the effect of shifting the portion of the image data within or with respect to a composite image. The portion of the first image data within the display area can form the second image. In some examples, the display area and non-display area can also be static, and the image data within the frame buffer can be shifted with respect to the static display area and the non-display area to create the shifting effect.

In some examples, the amount of shifting of the portion of the first image can be determined based on a measurement of movement of the HMD, as well as the locations of the HMD and the peripheral device at the second time. The measurement of movement can include, for example, an angle of rotation of the HMD. To determine the angle of rotation, an angular speed and direction of the rotation, as well as a time period elapsed between the first time and the second time can be determined. The angular speed and direction of rotation can be determined by, for example, an inertial measurement unit (IMU) of the HMD. Moreover, the time period elapsed between the first time and the second time can be determined based on a processing delay of the first image at the HMD. There are various ways of determining the processing delay. As an example, as part of a calibration process, the camera of the HMD can be used to capture an image of an object that provides an indication of time. The object may include, for example, a clock, a display device that displays a time-varying image (e.g., a bar code), a time-varying pattern emitted by a peripheral device, etc. The image can be analyzed to identify a pattern indicative of time (e.g., digits displayed by the clock, positions of clock arms, the bar code patterns, etc.), and timing information can be deduced from the identified pattern. The peripheral device may include, for example, a keyboard, a mouse, etc. The time indicated by the object can be synchronized with the timing of the HMD and can be used as the capture time of the image. When the HMD displays the image, the display time can be recorded. A difference between the display time and the capture time can represent the processing delay. Given that the processing delay is usually quite stable in a known system, the aforementioned calibration process can be used to determine the processing delay of other subsequent images at the HMD.

In addition, the locations of the HMD and the peripheral device within a physical space at the second time can be determined. A first location vector between a location of the peripheral device and a location of the HMD can be determined. In addition, a second location vector of the peripheral device with respect to the HMD can be determined by rotating the first location vector by the angle of rotation. The second location vector can be used to represent an uncorrected image location of the peripheral device in the first image. The second location vector can also represent the inverse of the shift needed to perform the correction. The amount of shift can be determined by determining a shift vector between the uncorrected image location of the peripheral device and the location of the peripheral device and scaling the shift vector back to the display coordinates. The scaling can be based on, for example, a matrix expression that projects world coordinates to display coordinates.

There are different ways to determine the locations of the HMD and the peripheral device. As an example, one or more sensor pods can be attached to the peripheral device to detect directional light beams from light emitters (e.g., lighthouses) positioned at different predetermined locations within the space. The sensor pods can also perform ranging measurements based on, for example, time-of-flight of the directional light. Based on the direction and time-of-flight information, as well as the known locations of the lighthouses, the location of the peripheral device can be determined. As another example, the peripheral device can include light emitters to emit directional light beams, which can be detected by a plurality of light sensors positioned at different predetermined locations within the space. The light sensors can also perform ranging measurements. Based on the ranging measurements as well as the direction of the light beams detected by the light sensors, as well as the known locations of the light sensors, the location of the peripheral device can also be determined. Similar techniques can also be used to determine the location of the peripheral device as well.

The second image, generated by processing the first image based on the measurement of the movement/rotation of the HMD, can be used to generate the composite image in different ways. As an example, a virtual element (e.g., the virtual keyboard) can be placed into the second image at the predicted image location of the interaction at the second time. As another example, a reality element (e.g., the hand/fingers of the user, or other body parts of the user) can be extracted from the second image at the predicted location of the interaction at the second time, and the realistic element can be placed in a virtual image that also includes a virtual element (e.g., the virtual keyboard) at the predicted location of the interaction at the second time. In both cases, an interaction between the hand and the virtual keyboard can be shown in the composite image. The reality element of the interaction (e.g., the hand of the user) is more likely to align with the virtual element of the interaction (e.g., the virtual keyboard), which can improve the consistency and quality of the interactive experience (especially for interactions that require coordination between visual and physical cues, such as typing), and reduce the likelihood of motion sickness.

In addition, according to some embodiments, a method of providing a mixed reality (MR) interaction is provided. The method may include: capturing, by a camera of a head-mounted display (HMD) of a user, a first image of a physical interaction between a user's body part and a physical object; performing, by the HMD, a segmentation of the first image into a first region of pixels corresponding to the user's body part and a second region of pixels corresponding to the physical object, the segmentation being based on a distribution of physical interactions at a plurality of locations of the physical object; generating, from one of the first region or second region of pixels, a composite image of a virtual interaction involving the user; and displaying, by the HMD, the composite image of the virtual interaction in place of the physical interaction to the user.

More specifically, the segmentation of the first image can be performed to distinguish between a user's body part (e.g. part of a hand, fingers, etc.) and a physical object being manipulated by the body part (e.g., a peripheral device such as a keyboard, a mouse, etc.) in an image of a physical interaction between the user and the physical object. The method of segmentation can be used to extract pixels predicted to be part of the body part from the image. Based on the distribution of interactions, one or more thresholds can be configured for comprising various attributes of the pixels (e.g., the colors of the pixels, the luminance of the pixels, etc.). Based on the comparison results, it can be determined whether the pixels are likely to be part of the user's body or part of the physical object, and a subset of the pixels can be extracted based on the determination. The extracted pixels may include, for example, pixels of the user's body part, or pixels of the physical object. In some examples, the extracted pixels can be placed into a composite image depicting a virtual environment to represent the virtual interaction. In some examples, the composite image can be derived from the first image based on replacing the extracted pixels with pixels of a virtual object (e.g., virtual hand/fingers). In both cases, the virtual interaction is to be depicted to the user in place of the physical interaction, to provide the user with a MR interaction experience.

As described above, the segmentation of the first image can be based on a distribution of interactions. The distribution can be determined based on historical information and/or instantaneous information. Specifically, the historical information can be in the form of a heat map or a probability map generated based on a statistical analysis of prior interaction activities. The prior interaction activities can be between the user and the peripheral device, between other users and other instances of the peripheral device and/or a similar peripheral device, etc. The heat map can provide a distribution of occurrences of interaction activities among the plurality of locations on the peripheral device. The statistical analysis can include, for example, determining, based on the number of occurrences and the time period in which the number is determined, a likelihood of a location of the peripheral device receiving an interaction activity. Locations on the peripheral device in the heat map can be mapped to pixels of an image of a user's interaction with the peripheral device. Based on the heat map or the probability map, a likelihood of finding pixels of the user's body part (e.g., hand, finger, etc.) at each of the plurality of locations can be determined. The likelihood information from the heat map can be used to determine one or more thresholds related to certain attributes of a pixel (e.g., luminance, color, etc.). For example, values of attributes (e.g., luminance, color, etc.) of pixels in regions having high likelihood of finding hand pixels can be adapted as thresholds for determining, in other images, whether a pixel is a hand pixel.

The thresholds can also be adapted for different operation conditions. In some examples, the thresholds can be increased for comparing pixels from locations where the likelihood of finding hand/fingers pixels is low, whereas the thresholds can be reduced for comparing pixels from locations where the likelihood of finding hand/fingers pixels is high. The thresholds can also be adapted based on the ambient light of the operating environment. For example, the luminance threshold for hand/fingers pixels can be adjusted up if the ambient light intensity is high, and the luminance threshold can be adjusted down for reduced ambient light intensity. In some examples, multiple thresholds can also be adapted for, for example, different users, different parts of their hands, etc. For example, different thresholds can be adapted to extract pixels of finger nails, finger segments, the palm, the wrist, etc., each of which may have different colors. Moreover, the thresholds can also be adapted for different users. For example, some users may have painted finger nails, and the thresholds for extracting pixels of finger nails of those users can be adjusted to account for the colors of the painted finger nails. As another example, some users may have tattoos and/or wear devices that cover all or part of their hands, etc., and the thresholds for extracting hand pixels for those users can be adjusted to account for the covered portions of their hands. A hand model can be defined for a user to include a distribution of thresholds for different regions of a hand for that user.

In some examples, the historical information can be used to compute, for example, the difference of the same pixel with respect to time, which can be used to perform a multi-stage pixel comparison process to improve computation efficiency. For example, continually computing the difference of overall intensity (or color change) from one frame to another can provide a visual map of the changing parts in the image, which can be used to identify one or more borders of pixels representing the moving objects, such as the user's hand or other body parts that interact with the peripheral device. The borders can define, for example, regions of pixels that are likely to be user's hand and other body parts, and only pixels belonging to the regions are compared against the threshold(s) to determine whether the pixels belong to the user's body part. With such arrangements, the total number of pixels to be compared with the threshold(s) for the segmentation process can be reduced, which can improve computation efficiency.

In some examples, the distribution of actions of the interactions can also be determined based on instantaneous information. For example, the peripheral device may include a plurality of motion sensors (e.g., keys of a keyboard) at the plurality of locations. A camera (which can be part of the HMD or can be a standalone device) can capture an image of the plurality of locations on the peripheral device. A sensor map can map different pixels of the image to the plurality of locations at which the plurality of motion sensors are located. When the motion sensors detect the interaction activities at one or more locations of the plurality of locations (e.g., keystroke actions, button pressing actions, touch/non-touch gestures, etc.), the motion sensors can trigger the camera to capture the image of the plurality of locations of the peripheral device, and the image also includes interaction activities. From the image and based on the sensor map, a first area of the peripheral device including the motion sensors that detect the interaction activities, and a second area surrounding the first area, can be determined. The first area may correspond to an area of peripheral device (e.g., keyboard keys, buttons, touch pads, etc.) that receive the interaction activities, and may contain pixels of the user's hand/fingers (or other body parts) engaged in the interaction activities. The second area may contain pixels of the peripheral device or other background object. A first histogram of different color components (e.g., relative intensities of each color component) can be determined for the first area. A second histogram of those components can also be determined for the second area. The thresholds for determining whether a pixel belongs to the user's hand/fingers can be determined based on the first and second histograms. For example, a threshold for determining whether a pixel belongs to the user's hand (e.g., a threshold probability that the pixel belongs to the hand) can be determined for each color component, with the threshold being determined based on a weighted average of the intensities of that color component in the first and second histograms. In other images, each color component of a pixel can be compared against the corresponding threshold to determine whether the pixel belongs to the user's hand.

In some examples, a combination of historical and instantaneous information can be used to set a second threshold for background detection. For example, images of locations of the peripheral device that have received very few or no interaction activities can be periodically captured, and a third histogram of color components of those locations can be determined. A second threshold for background detection can be determined based on the third histogram. The second threshold for background detection (e.g., a threshold probability that a pixel belongs to the background) can be combined with the first threshold for hand/fingers detection (e.g., a threshold probability that a pixel belongs to the hand/fingers) in different ways. As an example, the second threshold for background detection can be used as a first step of checking. If the pixel is very close to the second threshold and the outcome is not conclusive, the pixel can be compared against the first threshold for hand/fingers detection. As another example, a combined threshold can be determined by averaging the first and second thresholds, and the pixels of the image can be compared against the combined threshold to identify the hand pixels.

The determination of the thresholds can be part of a calibration process based on image replacement. For example, an image of a peripheral device (e.g., a keyboard) unobstructed by the user's hand/fingers can be captured. The pixels of the image can be used as a baseline/starting point for determining the thresholds to distinguish between hand/finger pixels and pixels of the peripheral device. As part of the calibration process, a user can place his/her fingers on the peripheral device in a pre-described manner, and a second image of the peripheral device covered by the fingers can be captured. Based on the known pixel locations of the hand/fingers, as well as the known pixel locations of the peripheral device that do not include the hand/fingers, the thresholds can be adapted from the baseline point to, for example, maximize the likelihood of correctly distinguishing between the pixels of the peripheral device and the pixels of the user's hand/fingers. The imaging of the peripheral device can also be periodically performed to provide updated image for determining the baseline thresholds to account for a change in the operating conditions (e.g., change in the ambient light intensity, the peripheral device being idle, etc.).

After the pixels of the user's body part (e.g., hand, fingers, etc.) are identified, a composite image can be generated by the identification of the pixels. For example, the extracted pixels (e.g., of a hand, fingers, etc.) can be placed into a virtual environment depicted in the composite image to represent the virtual interaction. The extracted pixels and/or the virtual environment can also be modified to harmonize each other. For example, the luminance of the extracted pixels can be adjusted to match the lighting condition of the virtual environment. As another example, virtual shadows cast by the hand (represented by the extracted pixels) onto a virtual peripheral device can also be added to the composite image. In some examples, additional pixels of the virtual environment can also be replaced by hand/fingers pixels to fill in the gaps in the extraction of the hand/fingers pixels.

By adapting the hand/background detection based on a distribution of actions on the peripheral device, the hand segmentation scheme can be less susceptible to other factors that can degrade the accuracy of hand detection, such as skin tone, light intensity, etc. For example, assuming that a user has a darker skin tone and/or operates a keyboard in a relatively dark environment, and an image of the user's operation of the keyboard is captured. Because of the darker skin tone of the user and/or the low ambient light in the environment, the hand pixels and the keyboard pixels in the image may be less distinguishable than a case where a user having lighter skin tone operates a dark keyboard under strong ambient light, which can reduce the accuracy of hand segmentation. Moreover, if the ambient light is low, the hand segmentation can also be disrupted. By adapting the detection thresholds based on a historical or an instantaneous distribution of actions on the keyboard, the hand detection can be based on an additional set of information, which can mitigate the effects of skin tone and light intensity. As a result, a more robust segmentation scheme that can accurately identify hand pixels for a wider range of skin tones and in a wider range of environments can be achieved.

Typical System Environment for Certain Examples

Figure 1B:
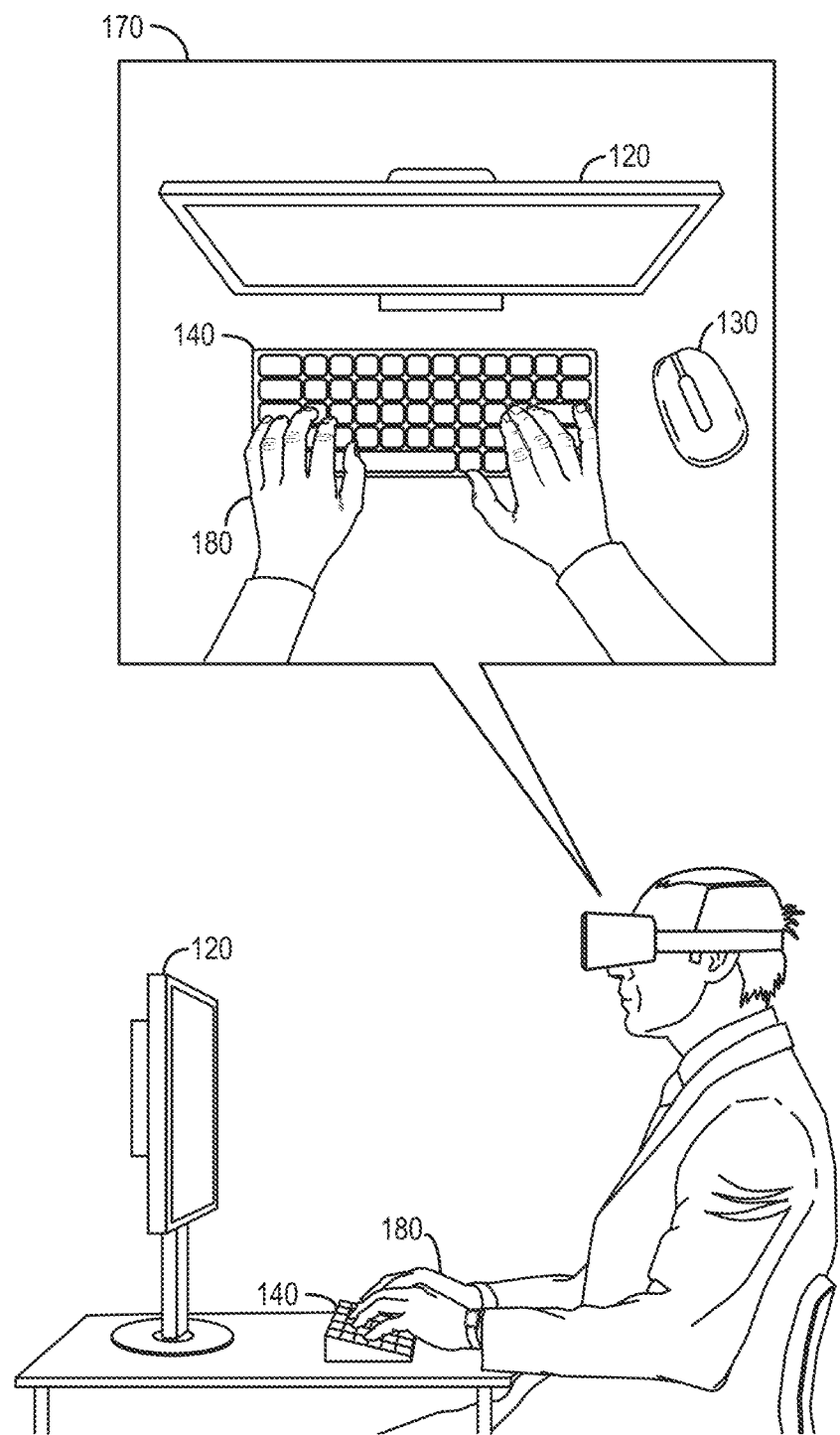

FIG. 1A and FIG. 1B show a typical implementation for a system 100 that can utilize the disclosed techniques. System 100 may include computer 110, display 120, and a plurality of peripheral devices including, for example, peripheral device 130 (e.g., "computer mouse 130"), peripheral device 140 (e.g., "keyboard 140"), peripheral device 150 (e.g., "microphone 150"), and peripheral device 160 (e.g., "head mounted display (HMD) 160"). For system 100, computer mouse 130, keyboard 140, and microphone 150 can be configured to control aspects of computer 110, display 120, and HMD 160 as would be understood by one of ordinary skill in the art. Computer 110 can be referred to as a "host computer" or a "host computing device." Each of peripheral devices 130-160 can include one or more sensors to sense an input action (or input signals, such as audio signals) provided by a user and generate corresponding sensor data (e.g., sensor data representing a distance of movement of computer mouse 130, sensor data indicating pressing of a key of keyboard 140, audio data collected by microphone 150, etc.). Peripheral devices 130-150 can provide the sensor data to computer 110 to control one or more operations of computer 110. For example, based on a movement detected by computer mouse 130, computer 110 can detect a selection of an audio file by the user in a graphical user interface displayed on display 120 and play the selected audio file. In addition, as shown in FIG. 1B, HMD 160 can capture images (e.g., camera image 170) of a user's interaction with one or more of mouse 130 or keyboard 140 and display the images of the user's interaction to the user. As to be described in more details below, HMD 160 can combine realistic elements from camera image 170 (e.g., hand 180 of the user, keyboard 140, mouse 130, etc.) with virtual elements to provide an immersive augmented reality (AR)/mixed reality (MR) experience.

Both computer 110 and HMD 160 may include a machine-readable medium (not shown) that is configured to store computer code, such as keyboard driver software, and the like, where the computer code is executable by a processor of computer 110 to affect control of computer 110 by peripheral devices 130, 140, and/or 150. The various examples described herein generally refer to peripheral device 120 as a display, peripheral device 130 as a computer mouse, peripheral device 140 as a keyboard, and peripheral device 150 as a microphone; however, it should be understood that peripheral devices 130-150 can be any input/output (I/O) device, user interface device, control device, input unit, or the like. For example, peripheral devices 130-150 can also be a remote control device, a wearable device (e.g., smart watch, wristband, glasses), a smart phone, or the like, and can provide input and output over a graphical user interface displayed in peripheral device 120.

Computer 110 is typically described as a desktop or laptop computing device. However, it should be understood that the host computing device can be any suitable computing device further including a tablet computer, a smart phone, etc. Computer 110 can also be part of HMD 160. HMD 160 can provide a virtual or augmented reality interface (e.g., having 2D or 3D displays), a holographic interface, or the like. One of ordinary skill in the art would understand the many variations, modifications, and alternative embodiments thereof.

Figure 2:
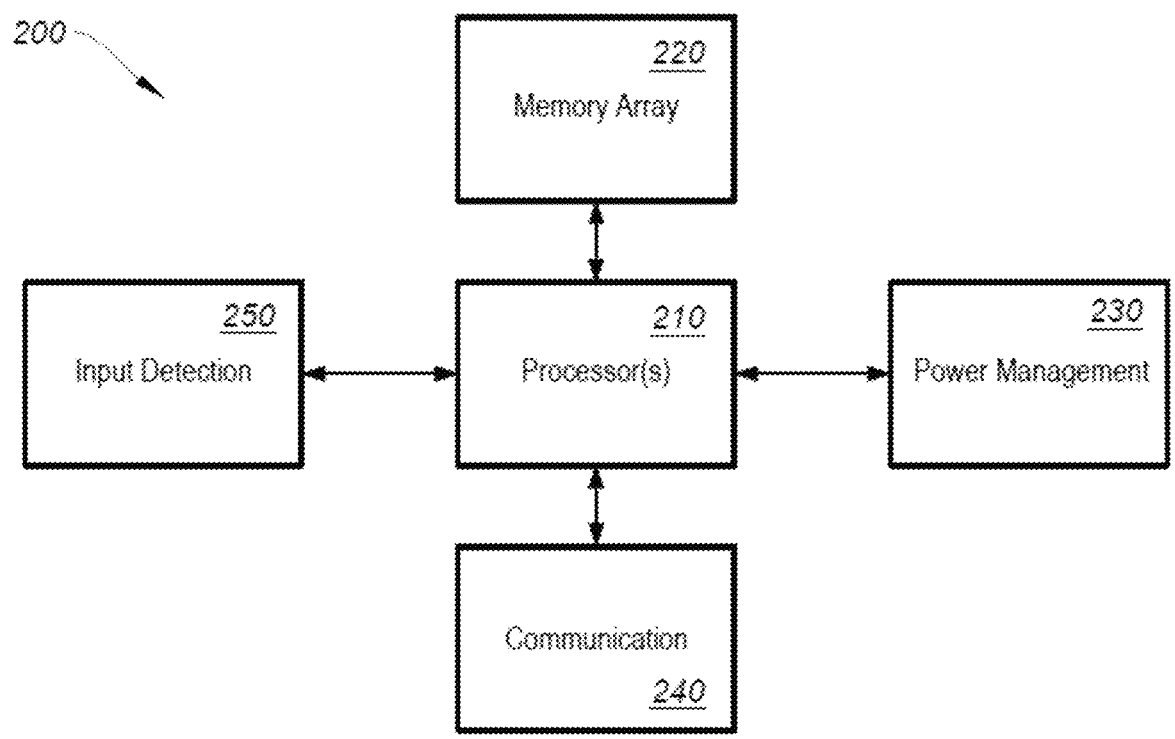
FIG. 2 shows a system for operating a peripheral device.

FIG. 2 shows a system for operating a peripheral device (e.g., one or more of peripheral devices 130-160), according to certain embodiments. System 200 includes processor(s) 210, memory array 220, power management system 230, communication system 240, and input detection module 250. Each of the system blocks 220-250 can be in electrical communication with the processor(s) 210 (e.g., via a bus system). System 200 may further include additional systems that are not shown or discussed to prevent obfuscation of the novel features described herein. System blocks 220-250 may be implemented as separate modules, or alternatively, more than one system block may be implemented in a single device. In some examples, system blocks 220-250 may be implemented on a peripheral device. In some examples, system blocks 220-250 may be implemented as a multi-device system including a peripheral device and a dongle. System blocks 220-250 can be configured to implement the techniques for displacement estimation to be described below.

In some examples, processor(s) 210 comprises one or more microprocessors (μCs) and can be configured to control the operation of system 200. Alternatively, processor(s) 210 may include one or more microcontrollers (MCUs), digital signal processors (DSPs), or the like, with supporting hardware and/or firmware (e.g., memory, programmable I/Os, etc.), as would be appreciated by one of ordinary skill in the art. Processor(s) 210 can control some or all aspects of operation of peripheral devices 130-160 (e.g., system block 220-250). Alternatively or additionally, some of system blocks 220-250 may include an additional dedicated processor, which may work in conjunction with processor 210. One of ordinary skill in the art would understand the many variations, modifications, and alternative embodiments thereof.

Memory array 220 may be configured to store information pertaining to one or more operational configurations of peripheral devices 130-150. As further discussed below, one or more operational configurations of peripheral devices 130-150 may include setting performance characteristics of peripheral devices 130-150, including but not limited to, a computer mouse scroll speed, a sensitivity of computer mouse movement sensor, mapping of keyboard hot keys, microphone volume, and the like. Memory array 220 may also store other configuration information used for communication with peripheral devices 130-150, as further discussed below.

Additionally, memory array 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for processing by processing devices. Software can be implemented as a single program or a collection of separate programs and can be stored in non-volatile storage and copied in whole or in-part to volatile working memory during program execution.

Power management system 230 can be configured to manage power distribution, recharging, power efficiency, and the like, for peripheral devices 130-150. In some embodiments, power management system 230 can include a battery (not shown), a USB based recharging system for the battery (not shown), and power management devices (e.g., low-dropout voltage regulators—not shown). In certain embodiments, the functions provided by power management system 230 may be incorporated into processor(s) 210. The power source can be a replaceable battery, a rechargeable energy storage device (e.g., super capacitor, Lithium Polymer Battery, NiMH, NiCd), or a corded power supply. The recharging system can be an additional cable (specific for the recharging purpose) or it can use a USB connection to recharge the battery.

Communications system 240 can be configured to provide wireless and/or wired communication between, for example, processors 210 and one or more of peripheral devices 130-150. Communications system 240 can be configured to provide radio-frequency (RF), Bluetooth®, BLE, WiFi, infra-red (IR), ZigBee®, Logitech Unifying®, or other suitable communication technology to communicate with other computing devices and/or peripheral devices. Communications system 240 may also provide hardwired connection with processors 210. The hardwired connection can include a serial interconnect such as, for example, Universal Serial Bus (USB), FireWire®, DisplayPort®, High-Definition Multimedia Interface (HDMI), etc.

Input detection module 250 can control the detection of a user-interaction with input elements on peripheral devices 130-150. For instance, input detection module 250 can detect user inputs based on sensor data from computer mouse 130. In some embodiments, input detection module 250 can work in conjunction with memory array 220 to generate input data to processors 210 based on the sensor data received from communication system 240. For example, based on scrolling speed information stored in memory array 220 as well as sensor data from computer mouse 130, input detection module 250 can calculate a distance traversed by a mouse pointer on display 120, and provide the distance information to processors 210 (or a renderer) to render the movement of the mouse on display 120.

Although certain systems may not be expressly discussed, they should be considered as part of system 200, as would be understood by one of ordinary skill in the art. For example, system 200 may include a bus system to transfer power and/or data to and from the different systems therein.

It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Examples of the disclosed techniques can be realized in a variety of apparatuses including electronic devices implemented using any combination of circuitry and software. Furthermore, aspects and/or portions of system 200 may be combined with or operated by other sub-systems as required by design. For example, input detection module 250 and/or memory array 220 may operate within processor(s) 210 instead of functioning as a separate entity. In addition, the inventive concepts described herein can also be applied to various peripheral devices and not limited to computer mice, keyboards, or microphones. System 200 can be applied to any of the peripheral devices described in the embodiments herein, whether explicitly, referentially, or tacitly described (e.g., would have been known to be applicable to a particular peripheral device by one of ordinary skill in the art). The foregoing embodiments are not intended to be limiting and those of ordinary skill in the art with the benefit of this disclosure would appreciate the myriad applications and possibilities.

Examples of Immersive Mixed Reality Experiences Generation

Figure 3A:
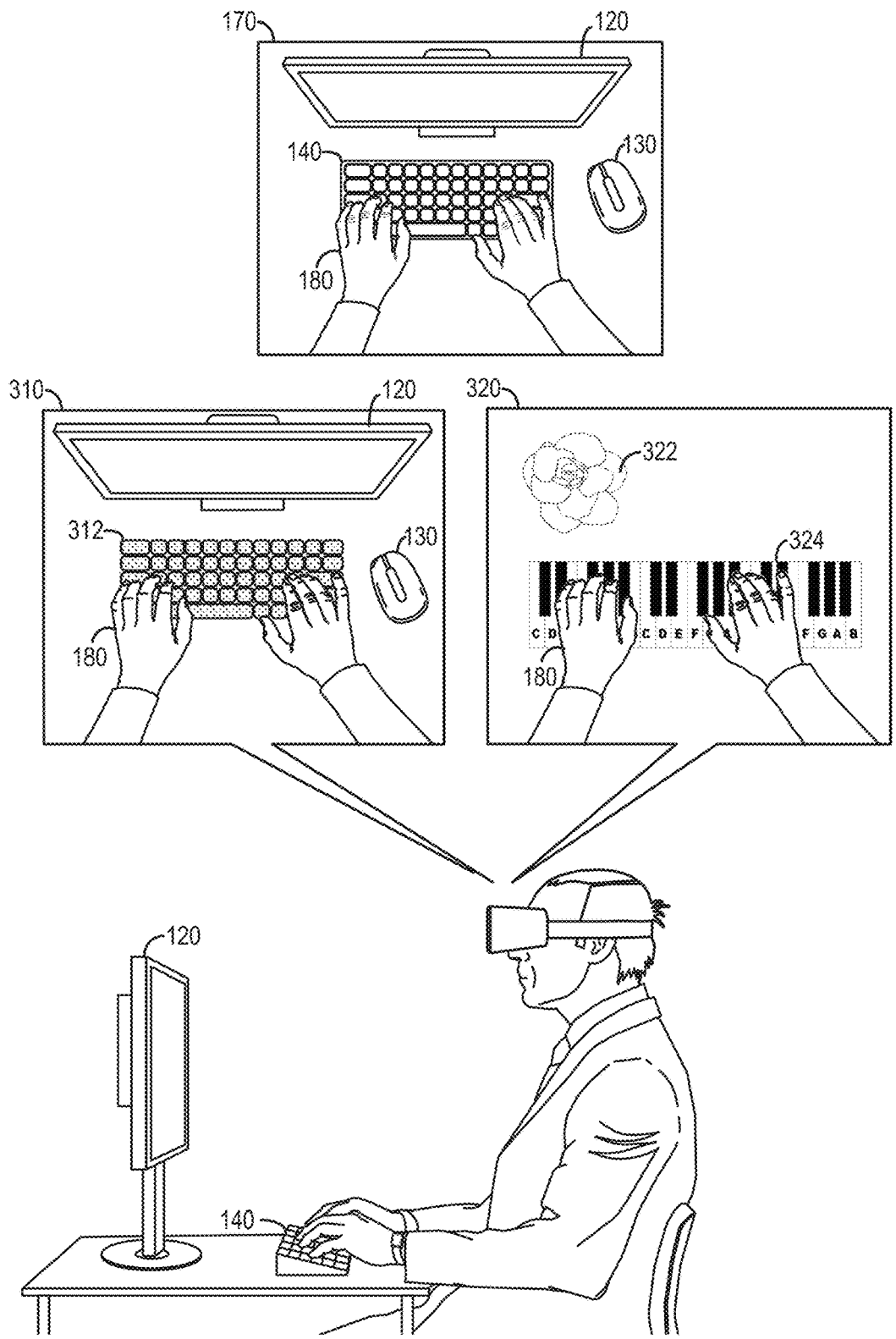
FIG. 3A-FIG. 3F illustrate examples of immersive mixed reality (MR) experience generation by the system of FIG. 1A and FIG. 1B, according to some embodiments.
Figure 3B:
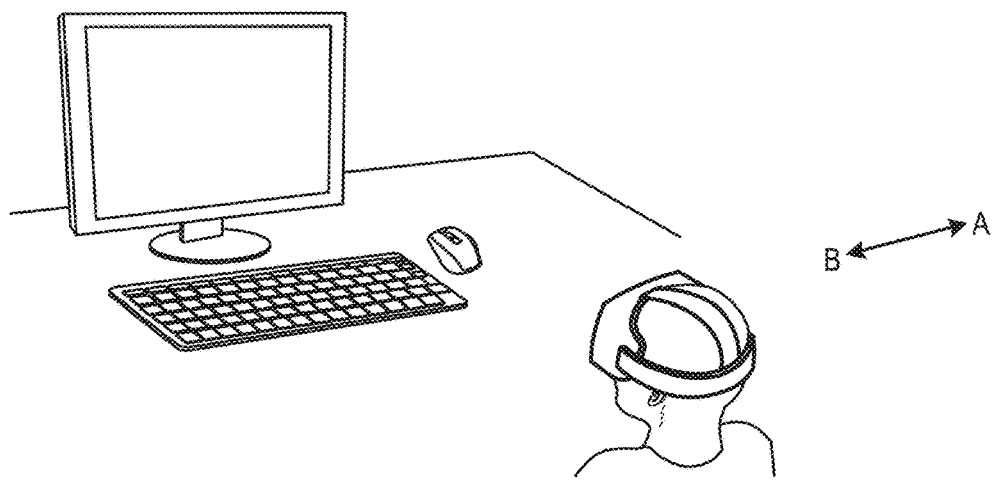
Figure 3B:
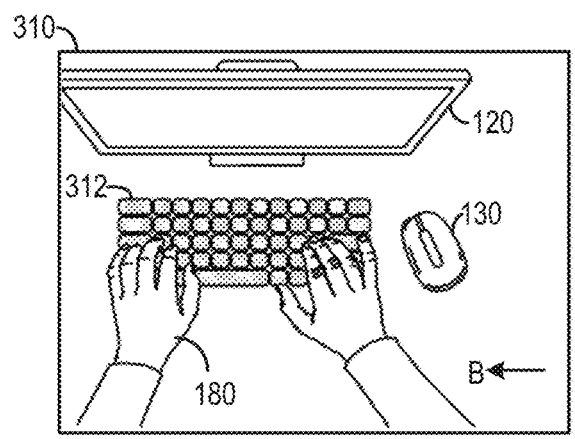
Figure 3B:
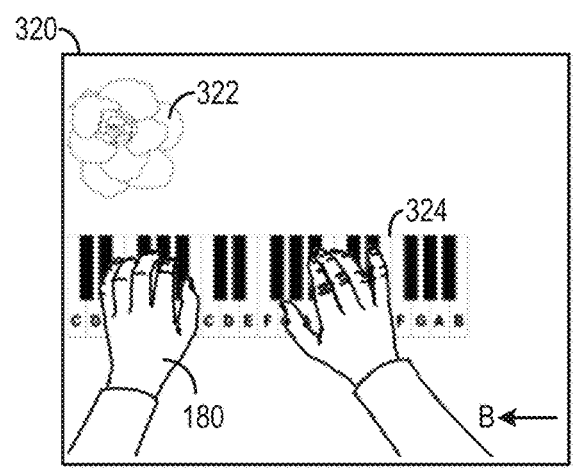

FIG. 3A-FIG. 3F illustrate examples of immersive mixed reality (MR) experiences generated by system 100 of FIG. 1A and FIG. 1B. As shown in FIG. 3A and FIG. 1B, HMD 160 can capture camera image 170 of a user's interaction with, for example, keyboard 140. Instead of displaying camera image 170 to the user, HMD 160 can combine some of the reality elements (e.g., user's hand 180) of camera image 170 with a virtual element 302, such as a virtual keyboard, to generate a composite image, and display the composite image to the user. To provide an immersive experience, a composite image can also depict the same interaction as shown in camera image 170, but the interaction is between user's hand 180 and virtual keyboard 302. For example, while camera image 170 may depict a typing action performed by a set of fingers of hand 180, the composite image may depict the same typing action performed by the same set of fingers of hand 180, but the typing action is performed on virtual keyboard 302 instead of keyboard 140. Although in this disclosure various examples describing interactions between a user's hand and a keyboard are provided, it is understood that those examples are non-limiting, and the disclosed techniques can be applicable for user interactions involving other types of body parts (e.g., fingers, arms, legs, feet, etc.) with other types of physical objects which are not limited to peripheral devices.

FIG. 3A also illustrates different ways of generating the composite image to provide an immersive MR experience. As shown in FIG. 3A, a composite image 310 can be generated by placing a virtual keyboard 312 into camera image 170 in place of keyboard 140, to depict user's hand 180 typing virtual keyboard 312 instead of keyboard 140. Composite image 310 retains all other reality elements including, for example, display 120, mouse 130, user's hand 180, etc. Moreover, a composite image 320 can also be generated by extracting images of user's hand 180 from camera image 170 and placed into a virtual image that depicts a set of virtual elements including, for example, a virtual flower 322 and virtual piano keys 324. User's hand 180 can be placed at an image location of composite image 320 that corresponds to the image location of keyboard 140 in camera image 170.

To improve the immersive interactive experience, the generation of composite image 310 and 320 can also be adapted to a location and an orientation of HMD 160, to create an effect of viewing the reality elements and the virtual elements from a different location and/or angle. For example, when the user rotates/moves his head towards the right (indicated by the label "A"), the content displayed by HMD 160 may shift towards the left (indicated by the label "B"). As shown in FIG. 3A, in composite image 310, both the reality elements (e.g., display 120, mouse 130, user's hand 180, etc.) and the virtual elements (e.g., virtual keyboard 312) shift to the left indicated by the label "B." Moreover, in composite image 320, both the reality elements (e.g., user's hand 180) and the virtual elements (e.g., virtual piano keys 312 and virtual flower 322) shift to the left indicated by the label "B."

Figure 3C:
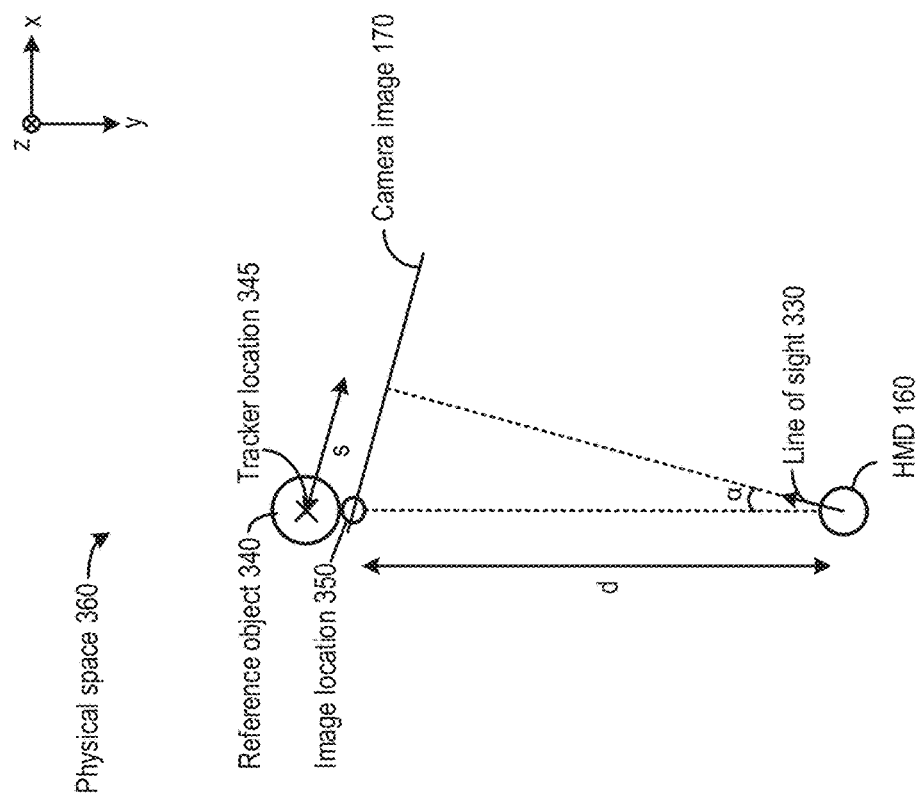
Figure 3C:
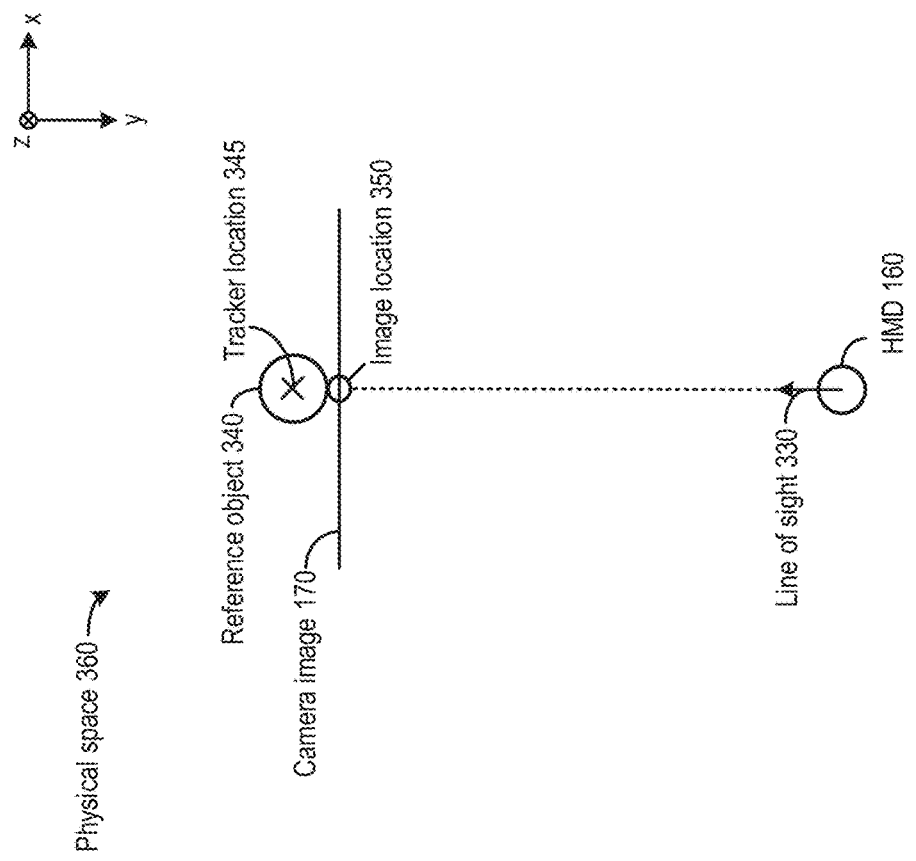

HMD 160 can perform the shifting of the display content in composite images 310 and 320 based on tracking a location of a reference object with respect to HMD 160. The reference object can be a peripheral device, such as keyboard 140. FIG. 3C illustrates examples of the tracking process. As shown on the left of FIG. 3C, the line of sight of a camera of HMD 160 (represented by arrow 330), aligns with a reference object 340, and a tracker location 345 of reference object 340 is at the center of camera image 170. As to be described below, tracker location 345 can be used to determine where to place a virtual element (e.g., virtual keyboard 312) or a reality element (e.g., user's hand 180) in a composite image. The tracker location allows the system to track reference object 340 with respect to HMD 160. Moreover, reference object 340 also forms an image at image location 350 in camera image 170, and image location 350 and tracker location 345 are identical. In some examples, image location 350 can be determined based on, for example, a segmentation process to identify and extract pixels of reference object 340 from camera image 170.

The location coordinates of HMD 160 and reference object 340 in physical space 360 (with reference to the x-y-z coordinates system), as well as the orientation of HMD 160 in physical space 360, can be determined by various location and orientation sensing techniques as to be described below. As shown on the right of FIG. 3C, as HMD 160 rotates clockwise towards the right, the line of sight of the camera of HMD 160 forms an angle α with respect to reference object 340. Assuming that angle α is small, based on the location coordinates of HMD 160 and reference object 340, HMD 160 can determine the distance between HMD 160 and object 340 (represented by label "d"), and compute an expected shift (represented by label "s") of tracker location 345 based on the following equation:

$$\text{shift of tracker location } 345 = d \times \sin(\alpha) \quad \text{(Equation 1)}$$

In addition, the camera of HMD 160 can also capture an updated camera image 170 when HMD 160 is at the new orientation, and image location 350 of reference object 340 can exhibit the same degree of shift as tracker location 345, such that tracker location 345 and image location 350 remain aligned.

Figure 3D:
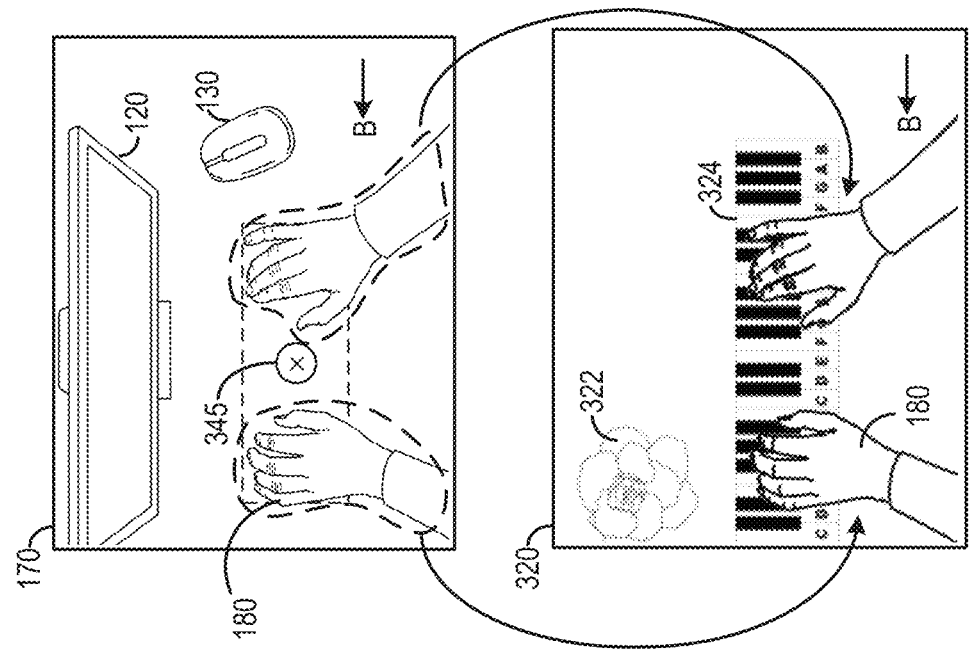
Figure 3D:
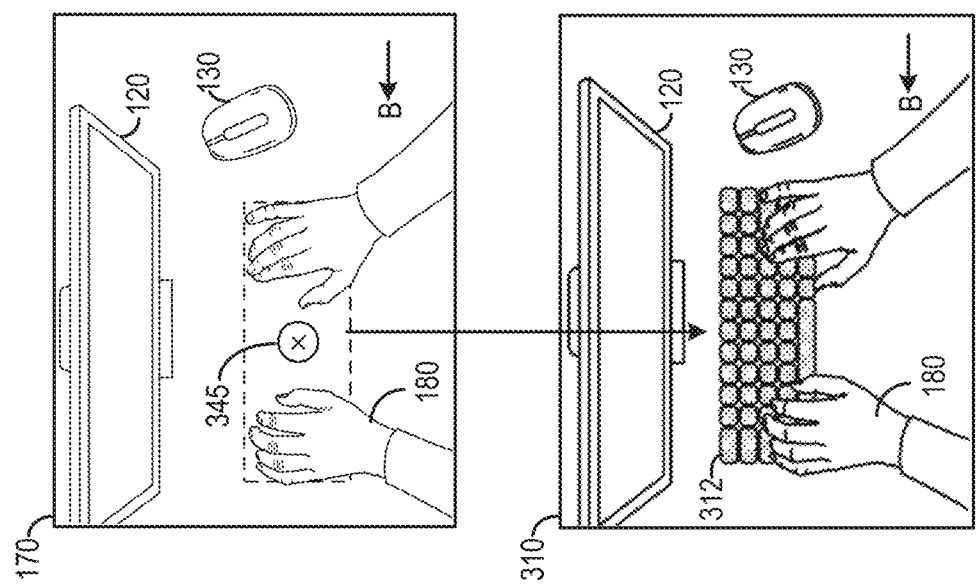

As described above, tracker location 345 can be used to determine where to place a virtual element (e.g., virtual keyboard 312) or a reality element (e.g., user's hand 180) in a composite image. FIG. 3D illustrates examples of placements of virtual and reality elements to form composite images. As shown on the left of FIG. 3D, tracker location 345 of keyboard 140 can be identified in camera image 170, and composite image 310 can be generated by replacing pixels of keyboard 140 at tracker location 345 with pixels of virtual keyboard 312. While tracker location 345 has been shifted left (indicated by "B") to account for the rotation of HMD 160, all other reality elements (e.g., display 120, mouse 130, keyboard 140, user's hand 180, etc.) in camera image 170 can also shift left if camera image 170 is captured when HMD 160 is at the new orientation with respect to keyboard 140 after the rotation. Moreover, as shown on the right of FIG. 3D, user's hand 180 can be extracted at tracker location 345 of camera image 170, based on the assumption that user's hand 180 is collocated with keyboard 140. The extracted hand image can be placed in a virtual image in which the virtual elements (e.g., virtual piano keys 324, virtual flower 322, etc.) are shifted left according to the shift in tracker location 345, to form composite image 320. In both cases, the shifting aligns a virtual element of an interaction (e.g., virtual keyboard 312, virtual piano keys 324, etc.) with a reality element of the interaction (e.g., user's hand 180), which allow accurate representation of the interaction and improve the immersive interactive experience.

Figure 3E:
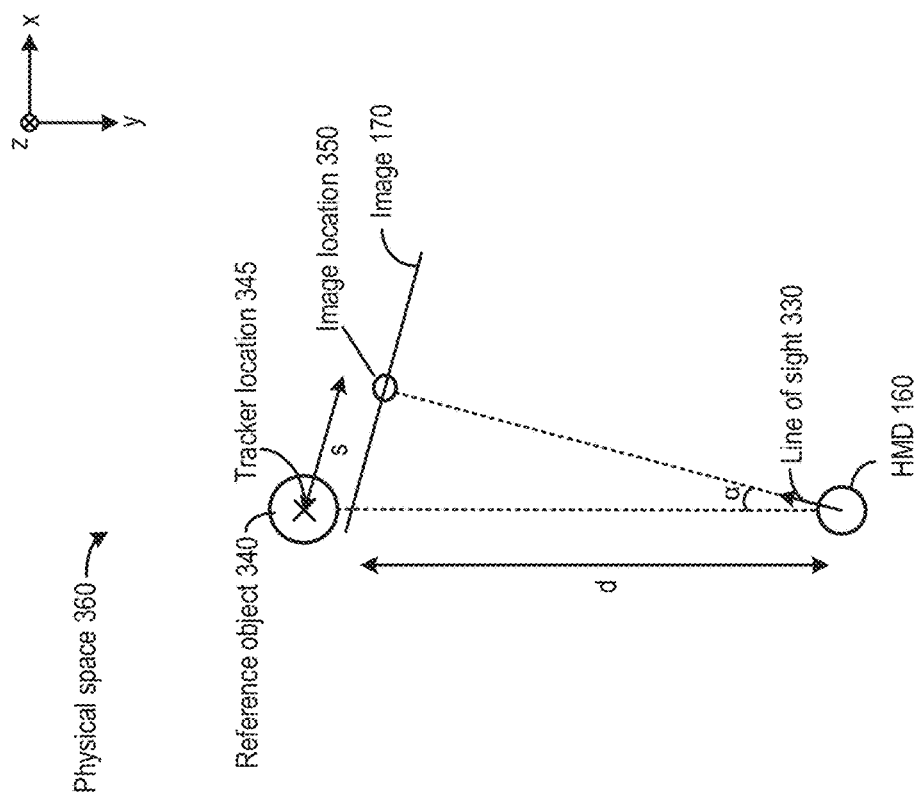
Figure 3E:
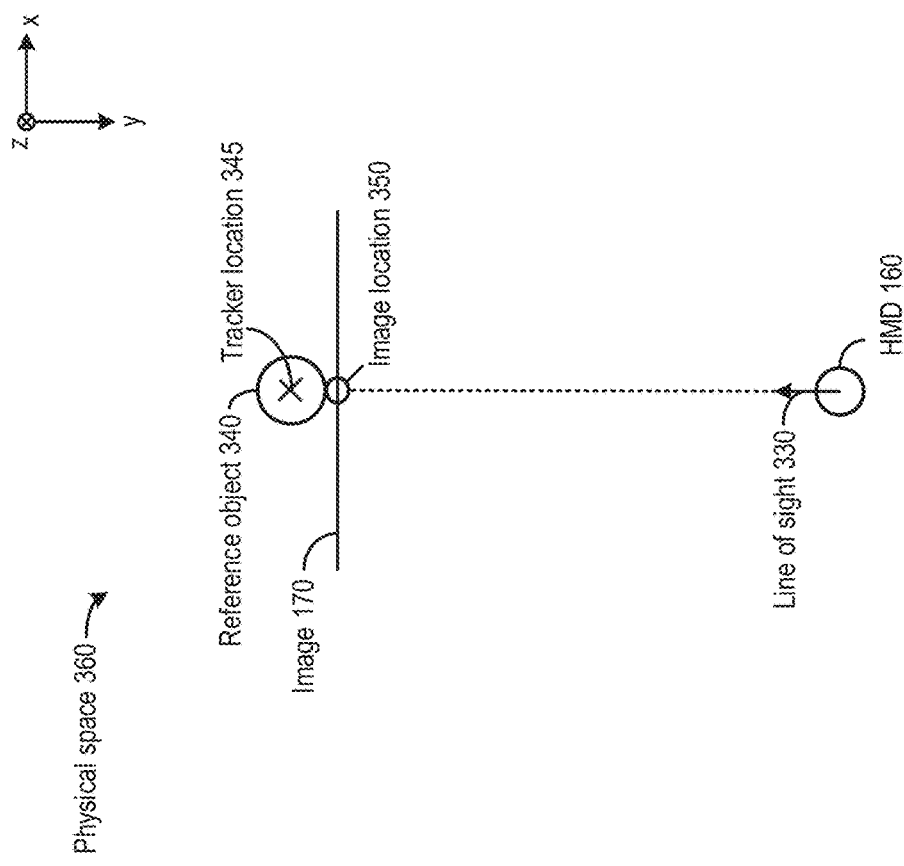
Figure 3F:
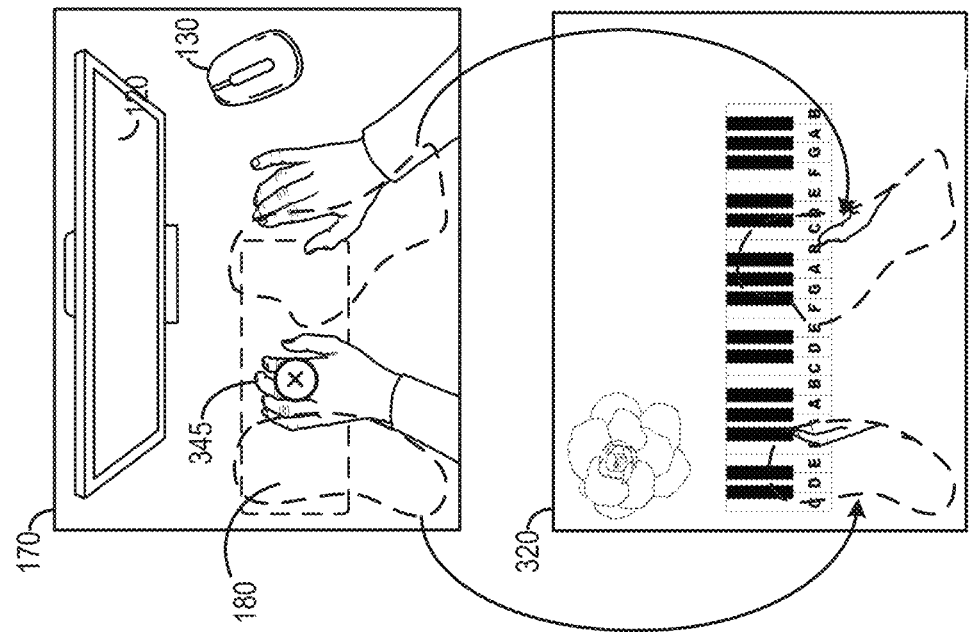
Figure 3F:
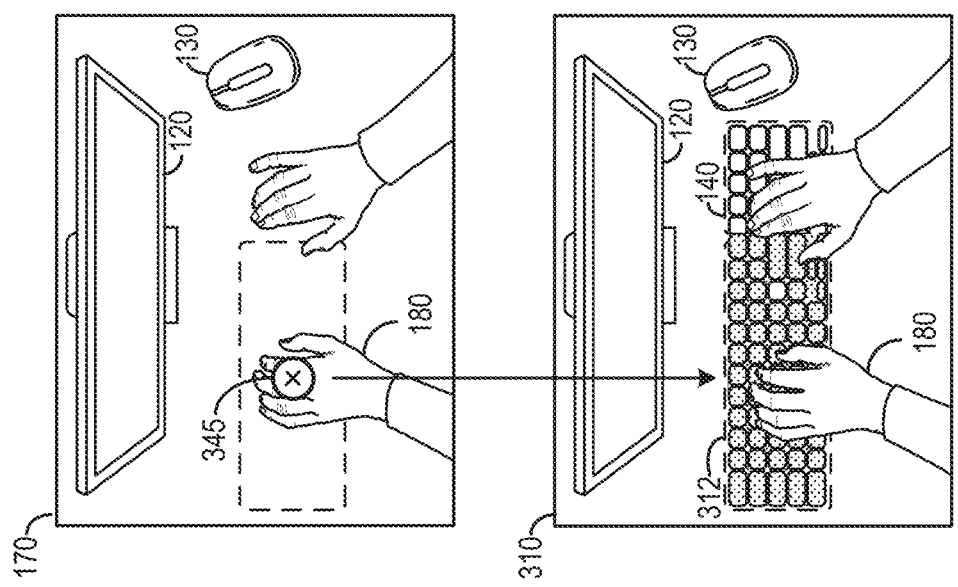

As described above, the alignment between the virtual element of the interaction and the reality element of the interaction in a composite image, during the movement of HMD 160, depends on the content of camera image 170 (from which the reality element is extracted or on which the virtual element is placed) also being shifted to reflect the movement of HMD 160. However, this is not necessarily the case. Due to processing delay (e.g., camera imaging delay, system processing delay, etc.), the camera image 170 used for composite image generation may not reflect the instantaneous orientation/location of HMD 160 with respect to reference object 340. FIG. 3E and FIG. 3F illustrate the effect of using an outdated camera image 170 to generate a composite image. As shown in FIG. 3E, after HMD 160 rotates by angle α, HMD 160 can shift tracker location 345 of reference object 340 based on the location coordinates of HMD 160 and reference object 340, as well as the detected angle of rotation α, as described above. However, due to processing delay, the actual image location 350 of reference object 340 (e.g., keyboard 140) in camera image 170 remains the same as before the rotation. As a result, tracker location 345 and image location 345 no longer align with each other.

FIG. 3F illustrates the effect of misalignment between tracker location 345 and image location 345 on the generation of composite images 310 and 320. As shown on the left of FIG. 3F, tracker location 345 of reference object 340 has been shifted left, but camera image 170 is not updated and the reality elements of camera image 170 have not been shifted left. When placing virtual keyboard 312 at the shifted tracker location 345, virtual keyboard 312 is no longer aligned with user's hand 180. Moreover, part of image of keyboard 140 may remain in camera image 170 and not be replaced by virtual keyboard 312. The depiction of the keyboard in composite image 310, as well as the relative location of user's hand 180 with respect to the keyboard in the composite image, can be very confusing to the user and can severely degrade the immersive interactive experience. Moreover, as shown on the right of FIG. 3F, pixels are extracted from camera image 170 at the shifted tracker location 345 with the expectation that the extracted pixels represent user's hands 180. The virtual elements in the virtual image (e.g., virtual flower 322, virtual piano keys 324, etc.) are also shifted left based on tracker location 345. But since camera image 170 is not updated, the extracted pixels may include a part (or none) of user's hand 180 and some other artifacts. The insertion of the extracted pixels in composite image 320 also creates confusing display effects for the user and severely degrades the immersive interactive experience.

Embodiments for Image Delay Compensation

FIG. 4A-FIG. 4D illustrate examples of an image delay compensation scheme to mitigate the misalignment between tracker location 345 and image location 350 due to the processing delay of camera image 170. As shown on the left of FIG. 4A, the content of camera image 170, including an image of reference object 340 at image location 350, can be shifted with respect to tracker location 345, so that image location 350 and tracker location 345 may be aligned. The effect of shifting the content of camera image 170 will be similar to HMD 160 capturing an updated camera image 170 at the new orientation with respect to reference object 340 after the rotational movement.

The amount of shift of camera image 170 can be determined based on the location coordinates of reference object 340 and HMD 160 in physical space 360, as well as rotation angle α. Based on the location coordinates of reference object 340 and HMD 160, a first location vector V1 from HMD 160 to reference object 340 can be determined. Moreover, a second location vector V2 from HMD 160, which corresponds to the uncorrected image location 350 of reference object 340, can be determined by rotating V1 by the rotational angle α. The uncorrected image location 350 can be determined based on V2 and the location coordinates of HMD 160. Assuming that tracker location 345 is represented by a label "P2" and uncorrected image location 350 is represented by label "P3," a shift vector $V_S$ for camera image 170 can be determined based on the following equation:

$$V_S = \text{vector}(P3, P2) \quad \text{(Equation 2)}$$

Figure 4A:
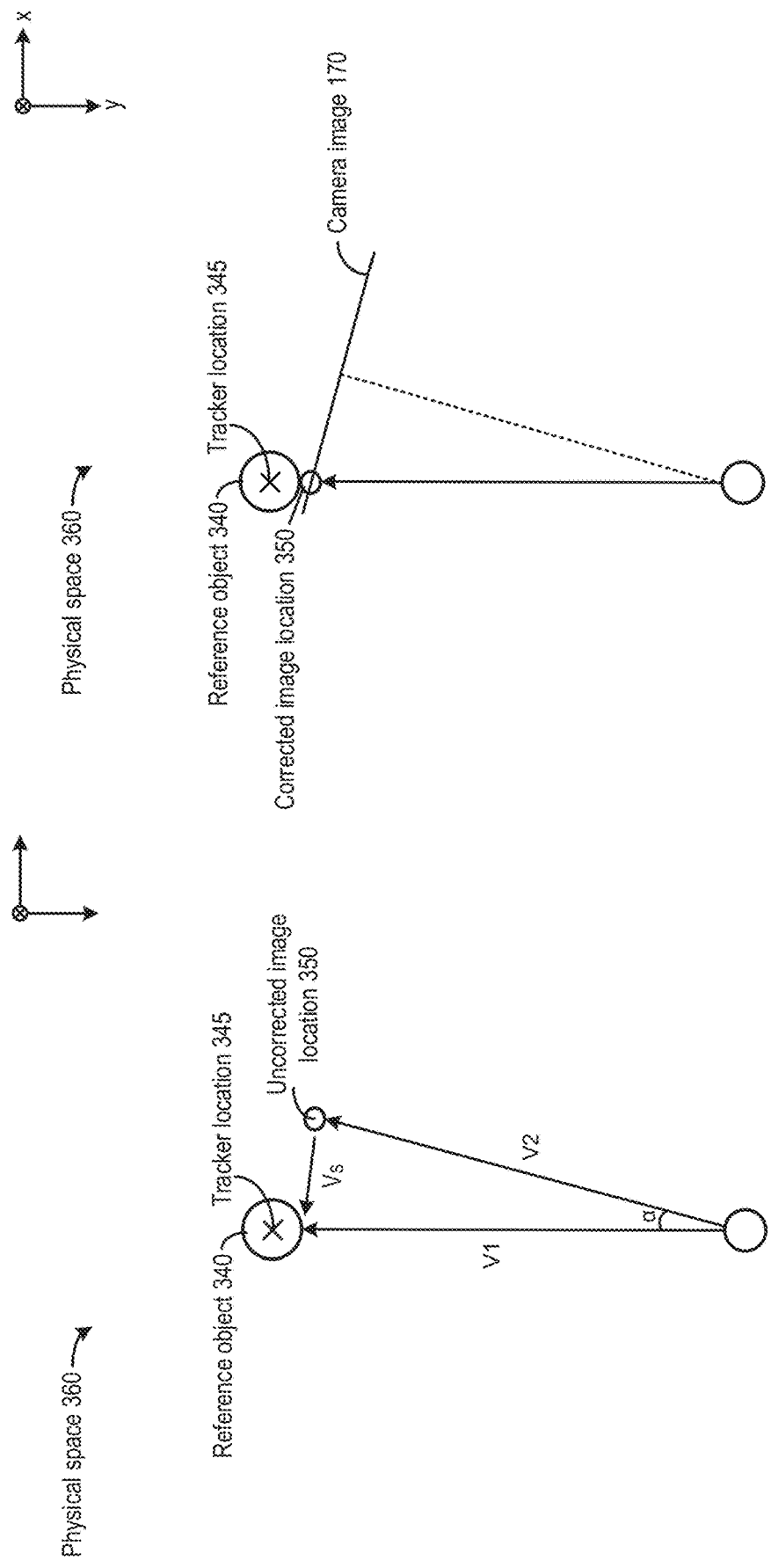
Figure 4B:
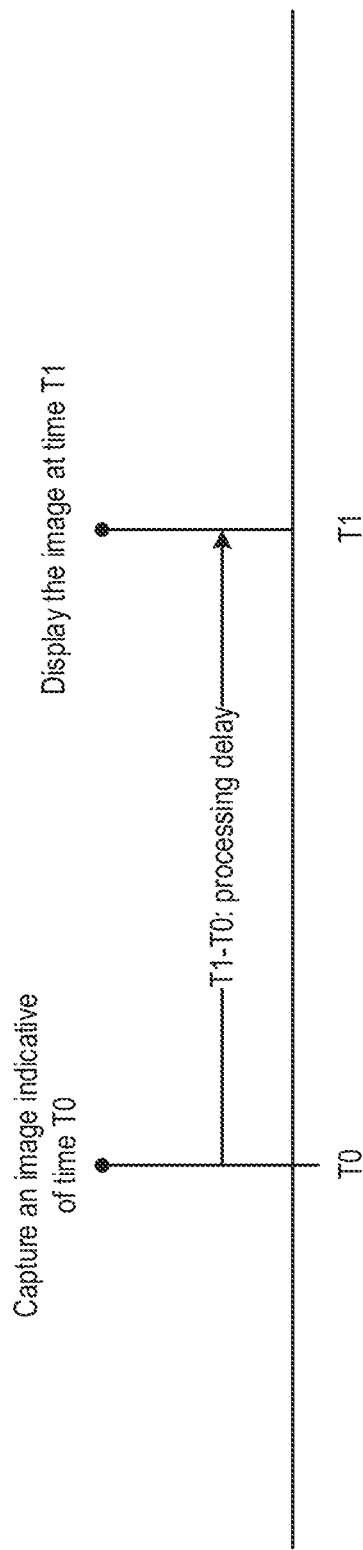

In Equation 2, shift vector $V_S$ can be determined as a vector from uncorrected image location 350 to tracker location 345. The direction of shift vector $V_S$ can indicate the direction of shifting. Although FIG. 4A illustrates that the shifting is perpendicular to the z-axis (which can correspond to the user of HMD 160 rotating his/her head), it is understood that the shifting can also occur perpendicular to x-axis or the y-axis corresponding to, for example, a nodding action of the user of HMD 160. Moreover the magnitude of shift vector shift vector $V_S$ can indicate the distance of shifting. The distance can be calculated in reference to the coordinates system of physical space 360, and scaled down to pixel distances. The scaling can be based on, for example, a matrix expression that projects world coordinates to display coordinates.

There are different ways to determine the locations of HMD 160 and reference object 340 (e.g., keyboard 140). As an example, one or more sensor pods can be attached to the reference object 340 to detect directional light beams from light emitters (e.g., lighthouses) positioned at different predetermined locations within physical space 360. The sensor pods can perform ranging measurements based on, for example, time-of-flight of the directional light. The sensor pods can transmit ranging measurements results to HMD 160. Based on the measurement results, as well as the known locations of the lighthouses and known direction of the light beams emitted by the lighthouses, HMD 160 can determine the location of reference object 340. As another example, reference object 340 can include light emitters to emit directional light beams, which can be detected by a plurality of light sensors positioned at different predetermined locations within physical space 360. The light sensors can also perform ranging measurement and transmit the ranging measurements results to HMD 160. Based on the ranging measurements, as well as the known directions of the light beams and locations of the light sensors, HMD 160 can determine the location of reference object 340. Similar techniques, or other techniques (e.g., simultaneous localization and mapping, Wi-Fi based positioning, etc.), can also be used to determine the location of HMD 160 within physical space 360.

In addition to the locations of HMD 160 and reference object 340, the determination of shift vector $V_S$ also relies upon rotation angle $\alpha$. Rotational angle $\alpha$ can correspond to the angle of rotation of HMD 160 from a first time when camera image 170 is captured to a second time when a composite image is to be generated and displayed to the user. The duration between the first time and the second time can correspond to the aforementioned processing delay. The rotational angle $\alpha$ can be determined as a product between an angular speed of HMD 160 and the duration between the first time and the second time. The angular speed can be measured by, for example, an inertial measurement unit (IMU) of HMD 160.

Moreover, the duration between the first time and the second time can be determined in different ways. For example, referring to FIG. 4C, as part of a calibration process, the camera of the HMD can be used to capture an image of an object that provides an indication of the first time (represented by T0 in FIG. 4C). The object may include, for example, a clock that shows the first time, a display device that displays a time-varying image (e.g., a bar code) indicative of the first time, a time-varying pattern emitted by a peripheral device (e.g., a keyboard, a mouse, etc.) and indicative of the first time, etc. The timing of the clock, the display device, the peripheral device, and the HMD can be all synchronized with a global clock. When the image is displayed on a display device at a second time (represented by T1 in FIG. 4C), the second time is recorded. A difference between the first time and the second time can be determined to represent the processing delay. HMD 160 can store the processing delay information internally and use the processing delay information to calculate rotational angle $\alpha$ for computation of shift vector $V_S$ if a rotational movement of HMD 160 is detected after camera image 170 is captured. If no rotational movement is detected after camera image 170 is detected, HMD 160 can determine that shifting of camera image 170 is not needed for the generation of a composite image.

Figure 4D:
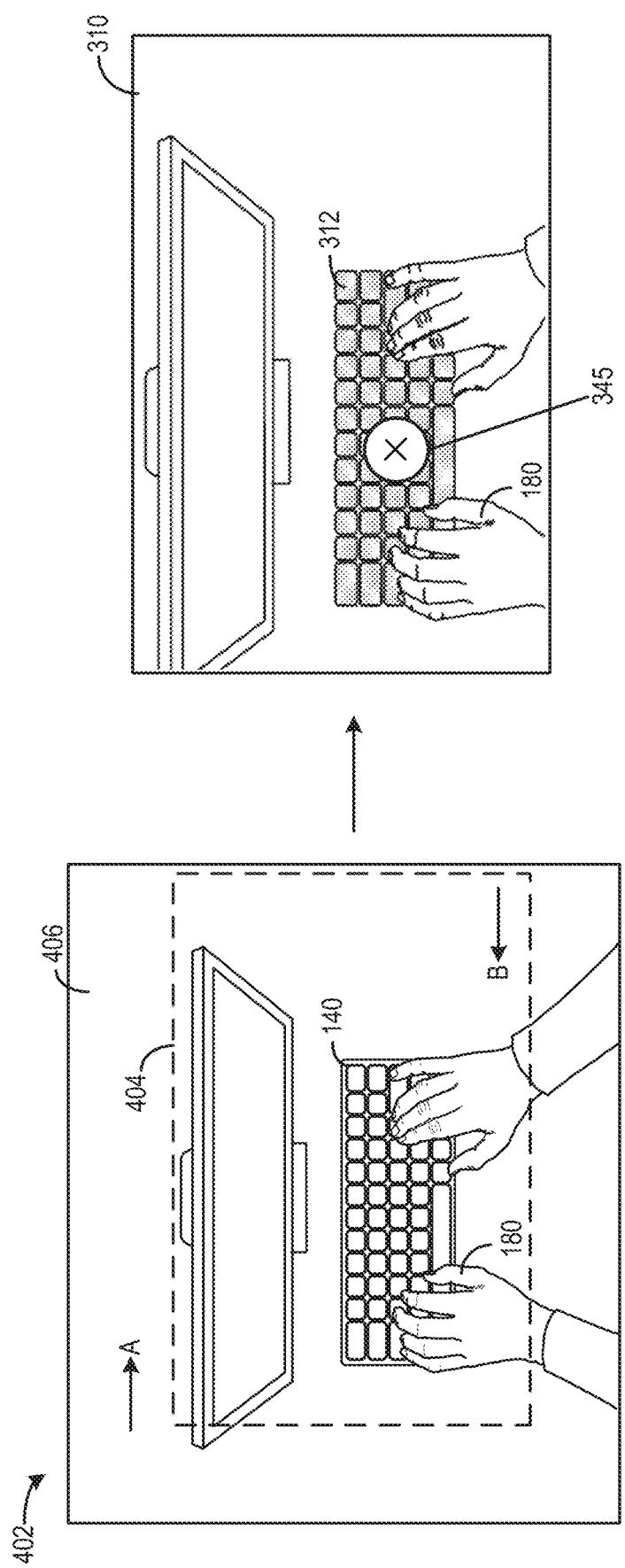

In some examples, the shifting of camera image 170 can be performed at a frame buffer that stores the camera image 170. FIG. 4C and FIG. 4D illustrate examples of shifting operations at a frame buffer 402. As shown in FIG. 4C, frame buffer 402 can store image data of camera image 170. Frame buffer 402 can be divided into a display area 404 and a non-display area 406. A first portion of camera image 170 stored at display area 404 can be provided as a second image 410 for composite image generation and/or for display, while a second portion of camera image 170 stored at non-display area 406 is not provided for composite image generation or for display. Display area 404 and non-display area 406 can refer to different groups of addresses or buffer storage spaces within frame buffer 402.

In some examples, the display area and the non-display area of frame buffer 402 can move to create the effect of shifting the content of camera image 170 within second image 410. For example, referring to FIG. 4D, to create the effect of shifting display 120, mouse 130, keyboard 140, and user's hand 180 to the left (indicated by label "B") in second image 410, display area 404 can shift towards the right (indicated by label "A") in frame buffer 402 to extract second image 410. Second image 410 can then be provided to composite image generation. In the example of FIG. 4D, the shifted tracker location 345 (based on the movement of HMD 160) aligns with the corrected image location 350 of keyboard 140. HMD 160 can then replace the pixels of keyboard 140 of second image 410 at the shifted tracker location 345 with the pixels of virtual keyboard 312 to generate composite image 310. Similarly, pixels of user's hand 180 can also be extracted at the shifted tracker location 345 of second image 410 and inserted into a virtual image (which is also shifted to account for the movement of HMD 160) to generate composite image 320. In some examples, the locations of display area 404 and non-display area 406 can also be static, and camera image 170 can be shifted within frame buffer 402 with respect to the static display area and the non-display area to create the shifting effect.

Embodiments for Hand Segmentation Based on Activity Distribution

As described above, the generation of a composite image to create an immersive AR/MR experience may involve distinguishing skin pixels of a user from the pixels of a background object (e.g., a keyboard, a mouse, or other peripheral devices). The skin pixels can be part of the user's hand, part of the hand, or other body parts that interact with the background object. For example, referring back to FIG. 3D, FIG. 3F, and FIG. 4D, when generating composite image 310, pixels of keyboard 140 are identified and replaced with pixels of virtual keyboard 312. Moreover, pixels of hand 180 can also be extracted and placed into composite image 310.

The identification of pixels of keyboard 140 and hand 180 may involve, for example, filtering out pixels that are likely to be part of user's hand 180. Moreover, when generating composite image 320, pixels of user's hand 180 are extracted and placed on top of virtual piano keys 324. In both cases, an image segmentation scheme can be employed to distinguish pixels of a user's body part (e.g., hands, fingers, etc.) from pixels of a background object. The image segmentation scheme can be based on, for example, comparing the pixels of an image against one or more thresholds representing, for example, a skin tone/color, a color of the background object, etc. A determination of whether the pixel belongs to a user's hand can be based on the comparison result.

Various factors can affect the accuracy of an image segmentation scheme. One factor can be the skin tone/color of the user. If the skin tone/color of the user appears to be similar to the color of the background object (e.g., a peripheral device being operated by the user), either due to the native skin tone/color or because of the ambient light condition, the skin pixel color of the user and the pixel color of the peripheral device captured by the camera may become very similar, which can lead to errors in the image segmentation process. The accuracy of the image segmentation process can be further degraded when a fixed threshold is used to compare the pixels, and the fixed threshold does not take into account factors such as, for example, different users may have different skin colors/tones, the ambient light condition may change according to the operating condition, etc.

In some embodiments, to improve the accuracy of an image segmentation process, the thresholds for pixel comparison can be adapted based on a spatial distribution of actions on the peripheral device. More specifically, the spatial distribution of actions can indicate which location(s) of the peripheral device (e.g., which key or region of a keyboard) has received certain user actions (e.g., tapping), and which location(s) of the peripheral device has not received any user action. The spatial distribution information can be used to adjust the thresholds. Specifically, an image that captures the user's body part (e.g., hand, fingers, etc.) interacting with the peripheral device can be obtained, and pixels of various locations of the peripheral device can be identified from the image. Based on the spatial distribution of actions, pixels that are likely to capture the user's body part can be identified. Various attributes of the identified pixels (e.g., luminance, colors, etc.) can be used to determine a threshold for comparing other pixels to determine whether those pixels belong to the body part. The spatial distribution information can be used as a secondary check. For example, the pixels may be compared against another threshold not determined based on the spatial distribution information. If the pixel comparison result is not conclusive or has a low confidence level, the spatial distribution information can be used to confirm or to overrule the comparison result. As an example, if the comparison result of a pixel is not conclusive, and the pixel corresponds to a location of the peripheral device which receives little or no user action as indicated by the spatial distribution information, it can be determined that the pixel does not belong to the user's body part.

Figure 5A:
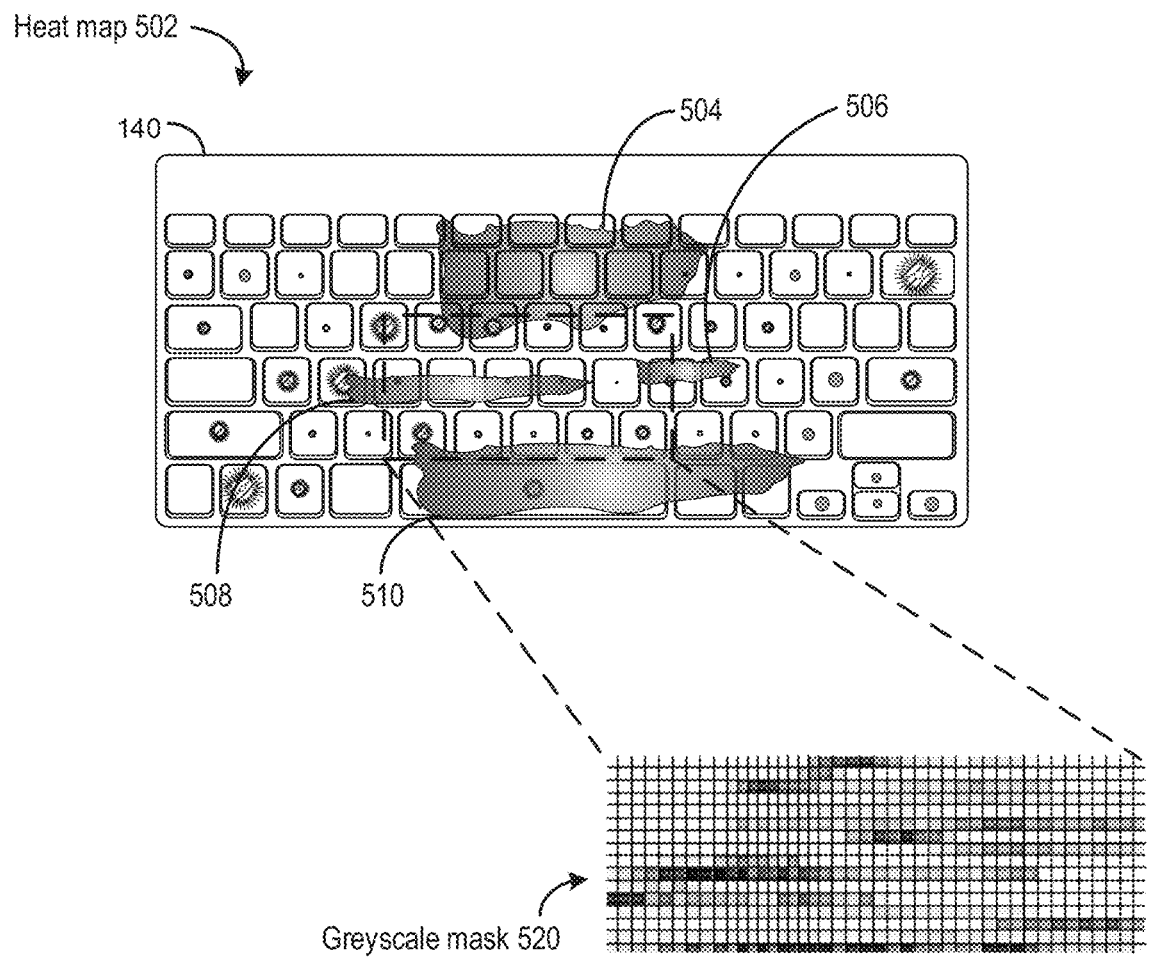
FIG. 5A-FIG. 5F illustrate examples of hand segmentation schemes, according to some embodiments.

The distribution of actions of the interaction can be determined based on historical information or instantaneous information. Specifically, the historical information can be in the form of a heat map or a probability map generated based on a statistical analysis of prior interaction activities. FIG. 5A illustrates an example of a heat map 502 of keyboard 140. Heat map 502 may represent the statistical level of interaction at any given location of keyboard 140. In FIG. 5A, areas 504, 506, 508, and 510 may represent most used areas (e.g., keys) of keyboard 140, whereas the rest of the area of keyboard 140 may represent least used areas. Each dark area can also include a distribution of usage within the area. Heat map 502 may be encoded as a grayscale mask for each pixel of keyboard 140 in an image. For example, grayscale mask 520 illustrates an example of a grayscale mask derived from part of heat map 502, which can be mapped to an image of keyboard 140. In grayscale mask 520, a black pixel may represent a likelihood of 100% of finding a pixel of a user's body part (e.g., hand, fingers), whereas a white pixel may represent a likelihood of 0%.

The likelihood information can be used to configure an image segmentation scheme, such as being used as a secondary check to confirm or overrule a decision from a comparison result, and/or to adapt the comparison thresholds. For example, assuming that a pixel is proving difficult to classify as skin or not skin (e.g., due to the pixel value being very close to the threshold), the likelihood information can be used to confirm or overrule a decision from a comparison result. As an illustrative example, if the comparison indicates that the pixel belongs to a skin, but the difference between the pixel and the threshold is below a confidence level, and if grayscale mask 520 for that pixel is dark, it can be determined that the pixel belongs to the skin. However, if grayscale mask 520 for that pixel is white, it can be determined that the pixel does not belong to the skin.

In some embodiments, the thresholds for comparing a pixel can be configured based on the grayscale mask 520. For example, from an image of keyboard 140, pixels that are likely to be user's body part/skin can be identified based on grayscale mask 520. The attributes of those pixels (e.g., color, luminance, etc.) can be used to determine a comparison threshold for comparing other pixels to determine whether those pixels belong to the user's body part/skin. The comparison process can also be adapted based on grayscale mask 520. For example, for pixels in an image that have high values in grayscale mask 520, the passing requirement to qualify as skin pixels can be more relaxed than pixels that have low values in grayscale mask 520. As an illustrative example, pixels that have high values in grayscale mask 520 can qualify as skin pixels even if those pixels are below the comparison threshold as long as the difference is within a difference threshold, whereas pixels that have low values in grayscale mask 520 must exceed the comparison threshold to quality as skin pixels.

Figure 5B:
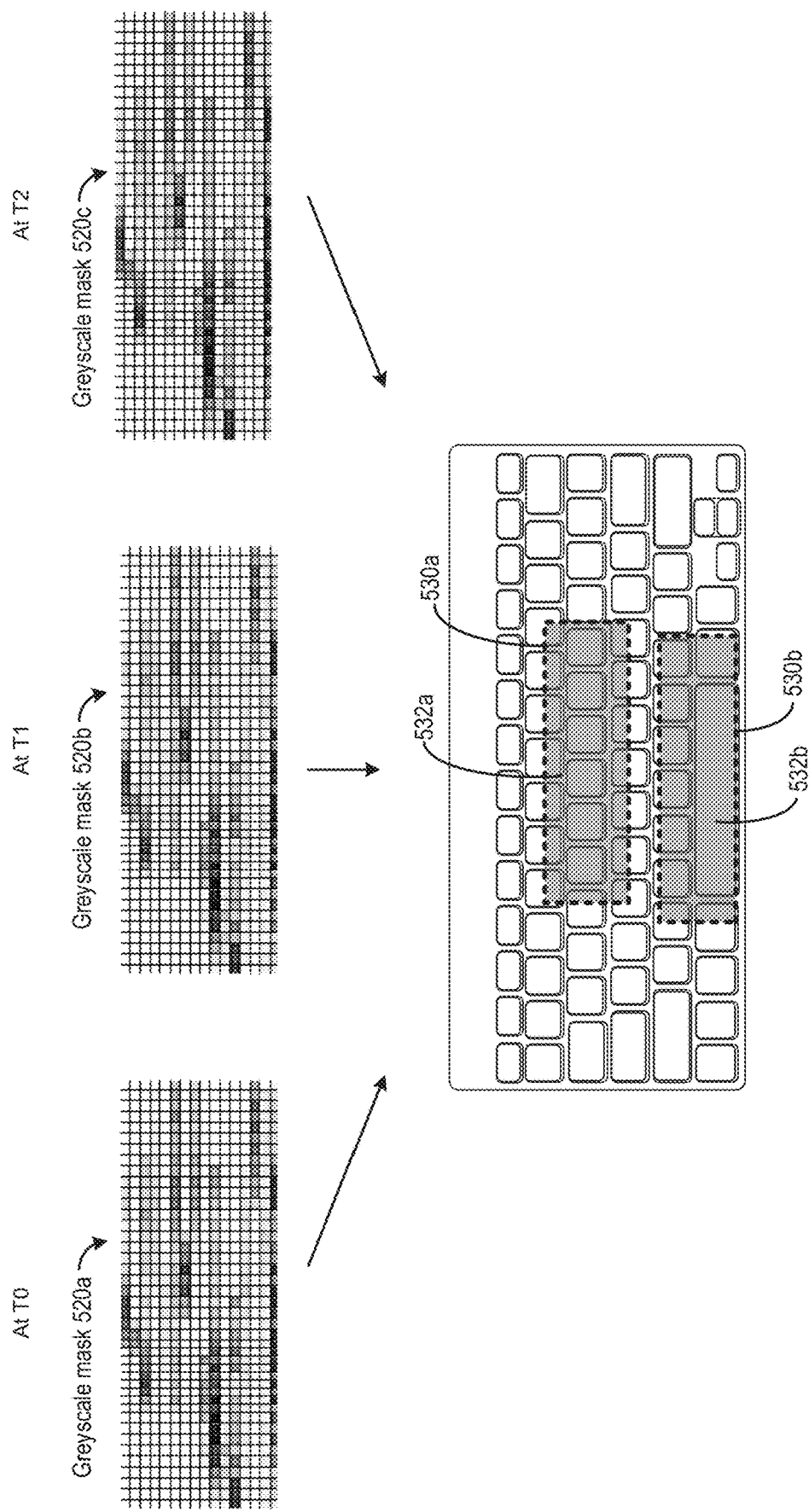

In some examples, the historical information can be used to compute, for example, the difference of the same pixel with respect to time, which can be used to perform a multi-stage pixel comparison process to improve computation efficiency. For example, as shown in FIG. 5B, multiple grayscale masks 520 (e.g., grayscale masks 520a, 520b, 520c, etc.) can be generated from different image frames. A difference in the overall intensity (or color change) from one frame to another can provide a visual map of the changing parts in the image, which can be used to identify one or more borders 530 (e.g., borders 530a, 530b, etc.) of pixels representing the moving objects, such as the user's hand or other body parts that interact with the peripheral device. The borders can define, for example, regions 532 of pixels (e.g., regions 532a, 532b, etc.) that are likely to be user's hand or other body parts, and only pixels belonging to the regions are compared against the threshold(s) to determine whether the pixels belong to the user's body part. With such arrangements, the total number of pixels to be compared with the threshold(s) for the segmentation process can be reduced, which can improve computation efficiency.

Figure 5C:
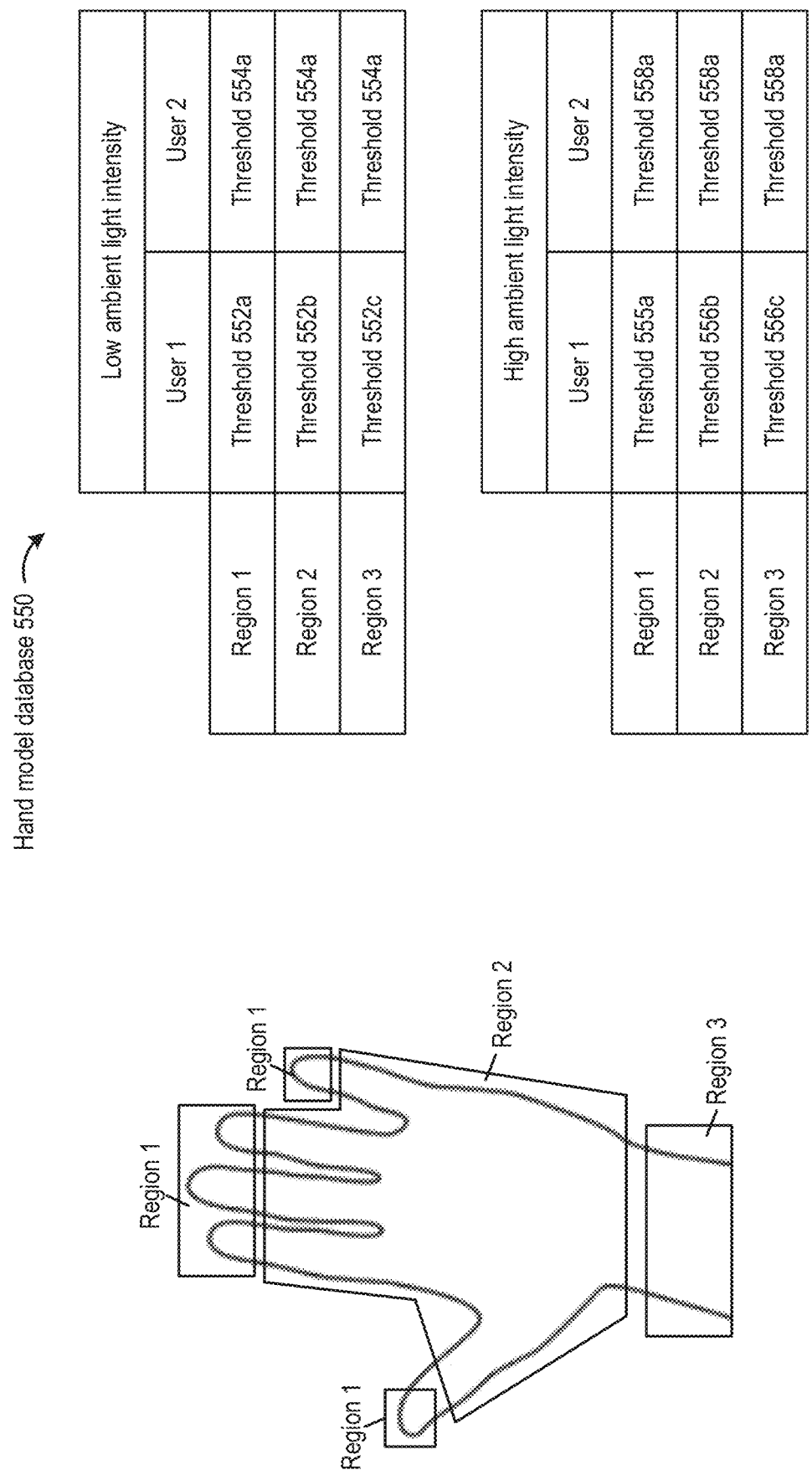

In some embodiments, the thresholds can also be adapted for different operation conditions and users. For example, the thresholds can also be adapted based on the ambient light of the operating environment. Specifically, the luminance threshold for hand/fingers pixels can be adjusted up if the ambient light intensity is high, and the luminance threshold can be adjusted down for reduced ambient light intensity. Moreover, multiple thresholds can also be adapted for, for example, different users, different parts of their hands, etc. For example, different thresholds can be adapted to extract pixels of finger nails, finger segments, the palm, the wrist, etc., each of which may have different colors. Moreover, the thresholds can also be adapted for different users. For example, some users may have painted finger nails, and the thresholds for extracting pixels of finger nails of those users can be adjusted to account for the colors of the painted finger nails. As another example, some users may have tattoos and/or wear devices that cover all or part of their hands, etc., and the thresholds for extracting hand pixels for those users can be adjusted to account for the covered portions of their hands. Referring to FIG. 5C, a hand model database 550 can be defined for a plurality of users to include a distribution of thresholds (e.g., thresholds 552-558 for different regions of a hand for different users and/or for different ambient light intensities.

There are many different ways of generating heat map 602. For example, heat maps can be compiled offline from analytics data or data sets of peripheral usages by other users for other instances of keyboard 140. Peripherals can also be grouped into categories based on the type and distribution of motion sensors (which can determine a distribution pattern of usage), and a heat map can be generated for each category to represent a statistical usage pattern for all of the peripheral devices within the category. Statistical analysis can also be performed to determine a likelihood of a location of the peripheral device receiving an interaction activity based on a number of occurrences of an interactive activity at that location and the time period in which the number is determined, and the statistical analysis can be repeated for different locations of the peripheral device. In some examples, the heat map can also be generated on-the-fly for a particular user to capture the user's pattern of usage of keyboard 140. Moreover, multiple heat maps/probability maps can be generated for different applications. For example, for gaming application, the heat map/probability map is likely to show high probability of finding fingers on certain keys (e.g., "w", "a", "s", "d" keys and the surrounding keys), while for coding and word processing applications the probability of finding fingers can be more evenly distributed among the keys of the keyboard. By training the heat maps per application, the accuracy of the heat maps providing accurate prediction of finger location for skin pixel extraction can be improved.

Figure 5D:
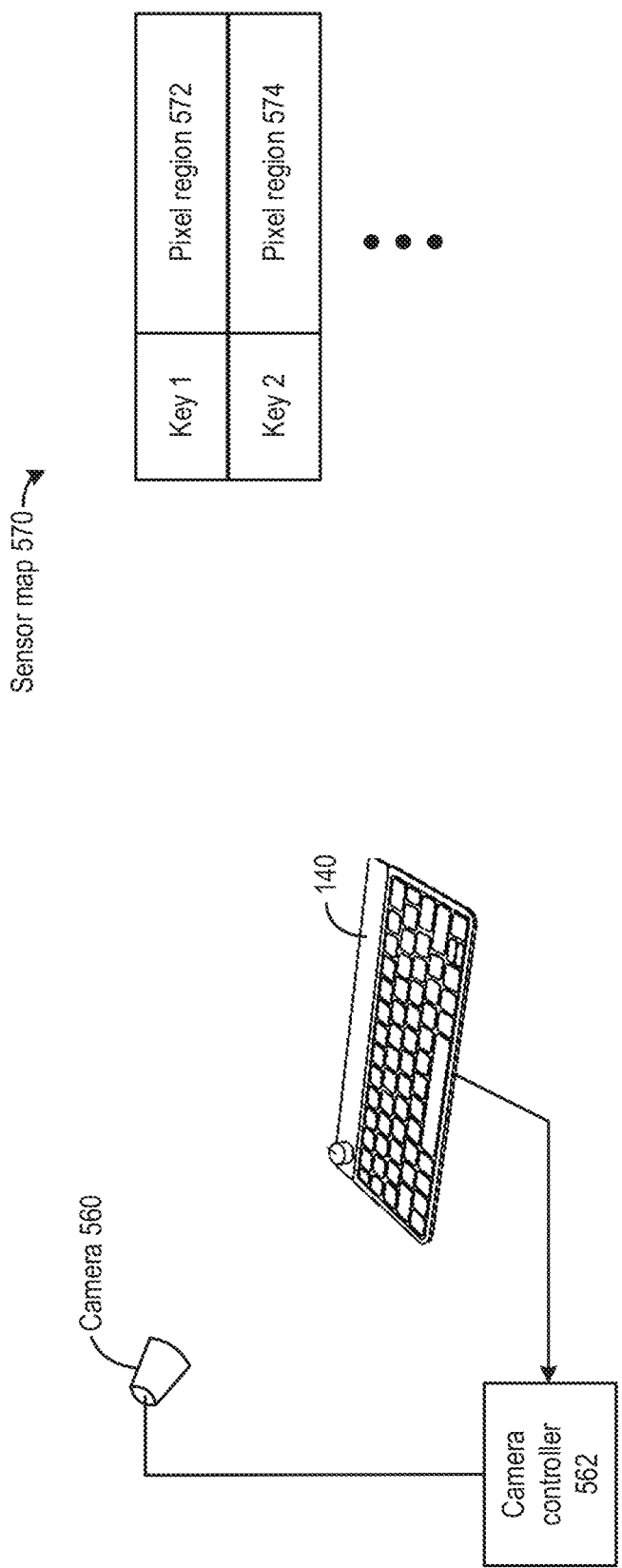
Figure 5E:
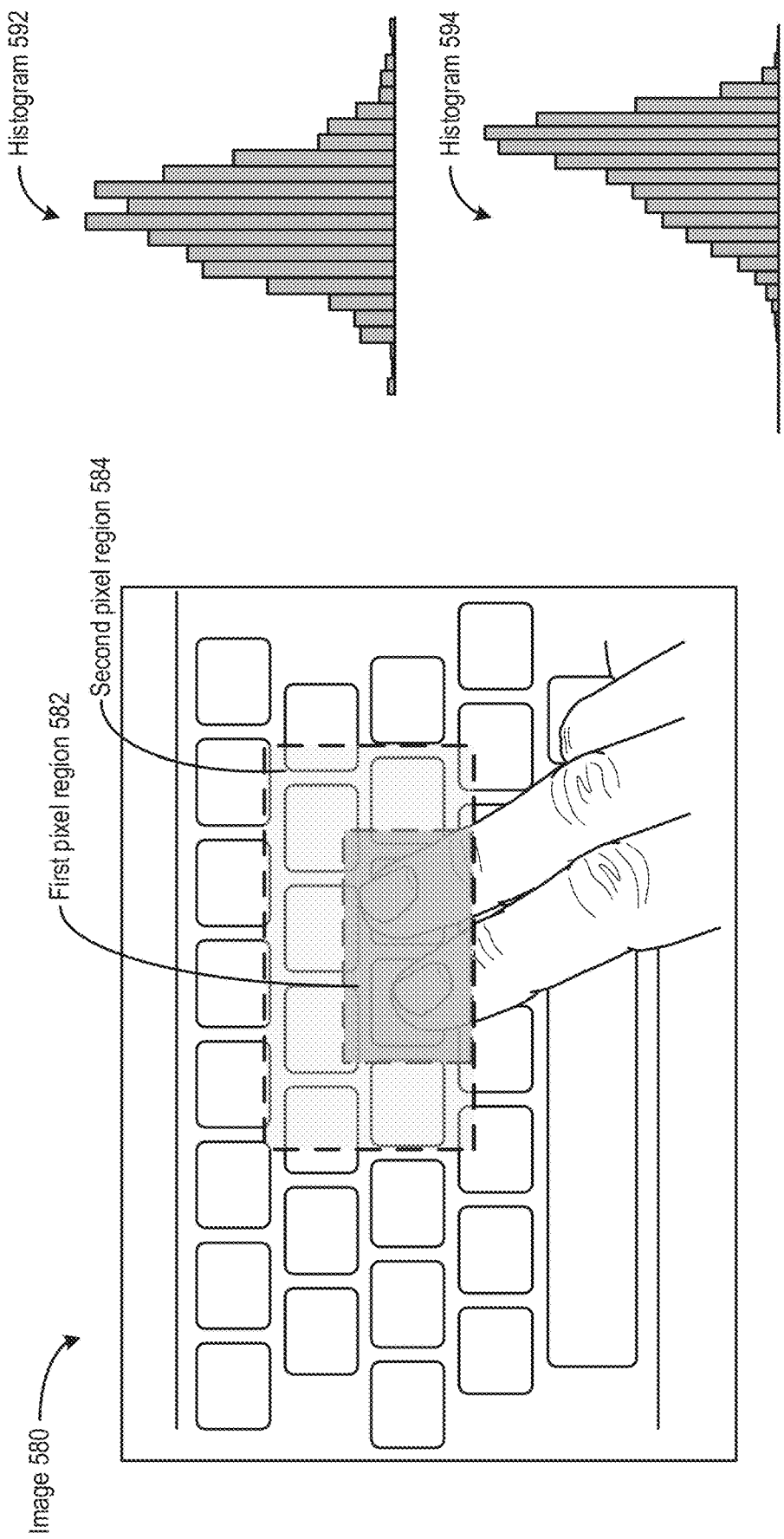

In some examples, the distribution of actions of the interactions can also be determined based on instantaneous information. FIG. 5D and FIG. 5E illustrates an example of collecting instantaneous distribution of actions for hand segmentation. As shown in FIG. 5D, images of keyboard 140 can be captured by a camera 560 controlled by a camera controller 562. Camera 560 (as well as camera controller 562) can be, for example, a camera of HMD 160, or other cameras having an unoccluded view of keyboard 140. The capturing of images of keyboard 140 can be triggered by camera controller 562 based on detection of a keystroke action of one or more keys by the motion sensors of keyboard 140. A sensor map 570 can be provided to map different pixel regions (e.g., pixel regions 572, 574, etc.) of the image to the keys of keyboard 140. Although FIG. 5D illustrates a keyboard, it is understood that other peripheral devices and motion sensors (e.g., buttons, touch pads, etc.) can also be used to collect instantaneous interactions information.

FIG. 5E illustrates an image 580 of keyboard 140 captured by camera 560. Based on sensor map 570 as well as the detection of the keystrokes, camera controller 562 can identify a first pixel region 582 corresponding to the one or more keys that receive the keystroke action. The image processor can also identify a second pixel region 584 adjacent to or around first area 582 that does not receive the keystroke action. First pixel region 582 may contain pixels of the user's hand engaged in the keystroke action, whereas second pixel region 584 may contain pixels of keyboard 140. A first histogram 592 of a set of color components (e.g., relative intensities for each color component) can be determined for first pixel region 582. A second histogram 594 for the same set of color components can also be determined for second pixel region 584.

First histogram 592 and second histogram 594 can be used to adapt the thresholds for comparing pixels for image segmentation (e.g., to determine whether the pixels belong to a user's hand/fingers). For example, a threshold can be computed for each color component, and each threshold can be computed based on, for example, averaging (or performing a weighted average of) the intensities of the color component between first histogram 592 and second histogram 594. A set of thresholds for a set of color components can be determined. To determine whether a pixel belongs to a hand or a background object, a set of intensities of the color components of the pixel can be computed. The set of intensities can be compared against the set of thresholds, and a decision of whether the pixel belongs to a hand/fingers can be determined from the comparison results. In some examples, the histogram data can also be used to redefine a ground truth of the user's skin tone. The ground truth information can be used to train a machine learning model to perform hand segmentation on image pixels collected at different light conditions.

In some examples, a combination of historical and instantaneous information can be used to set a second threshold for background detection. For example, images of locations of the peripheral device that have received very few or no interaction activities can be periodically captured, and a third histogram of color components of those locations can be determined. A second threshold for background detection can be determined based on the third histogram. The second threshold for background detection (e.g., a threshold probability that a pixel belongs to the background) can be combined with the first threshold for hand/fingers detection (e.g., a threshold probability that a pixel belongs to the hand/fingers) in different ways. As an example, the second threshold for background detection can be used as a first step of checking. If the pixel is very close to the second threshold and the outcome is not conclusive, the pixel can be compared against the first threshold for hand/fingers detection. As another example, a combined threshold can be determined by averaging the first and second thresholds, and the pixels of the image can be compared against the combined threshold to identify the hand pixels.

The determination of the thresholds can be part of a calibration process based on image replacement. For example, referring back to FIG. 5D, an image of keyboard 140 unobstructed by the user's hand/fingers can be captured.

The pixels of the image can be used as a baseline/starting point for determining the thresholds to distinguish between hand/finger pixels and pixels of the peripheral device. As part of the calibration process, a user can place his/her fingers on keyboard 140 in a pre-described manner, and a second image of keyboard 140 covered by the fingers can be captured. Based on the known pixel locations of the hand/fingers (e.g., based on the detection keystrokes as well as sensor map 570), as well as the known pixel locations of keyboard 140 that do not include the hand/fingers, the thresholds can be adapted from the baseline point to, for example, maximize the likelihood of correctly distinguishing between the pixels of keyboard 140 and the pixels of the user's hand/fingers. The imaging of keyboard 140 can also be periodically performed to provide updated image for determining the baseline thresholds to account for a change in the operating conditions (e.g., change in the ambient light intensity, the peripheral device being idle, etc.).

After the pixels of the user's body part (e.g., hand, fingers, etc.) are identified, a composite image can be generated by the identification of the pixels. For example, the extracted pixels (e.g., of a hand, fingers, etc.) can be placed into a virtual environment depicted in the composite image to represent the virtual interaction, as shown in FIG. 4D. The extracted pixels and/or the virtual environment can also be modified to harmonize each other. For example, referring back to FIG. 4D, the luminance of the extracted pixels of hand 180 can be adjusted to match the lighting condition of the virtual environment in composite image 310. As another example, virtual shadows cast by hand 180 (represented by the extracted pixels) onto virtual keyboard 312 can also be added to composite image 310. In some examples, additional pixels of the virtual environment can also be replaced by hand/fingers pixels to fill in the gaps in the extraction of the hand/fingers pixels.

Figure 5F:
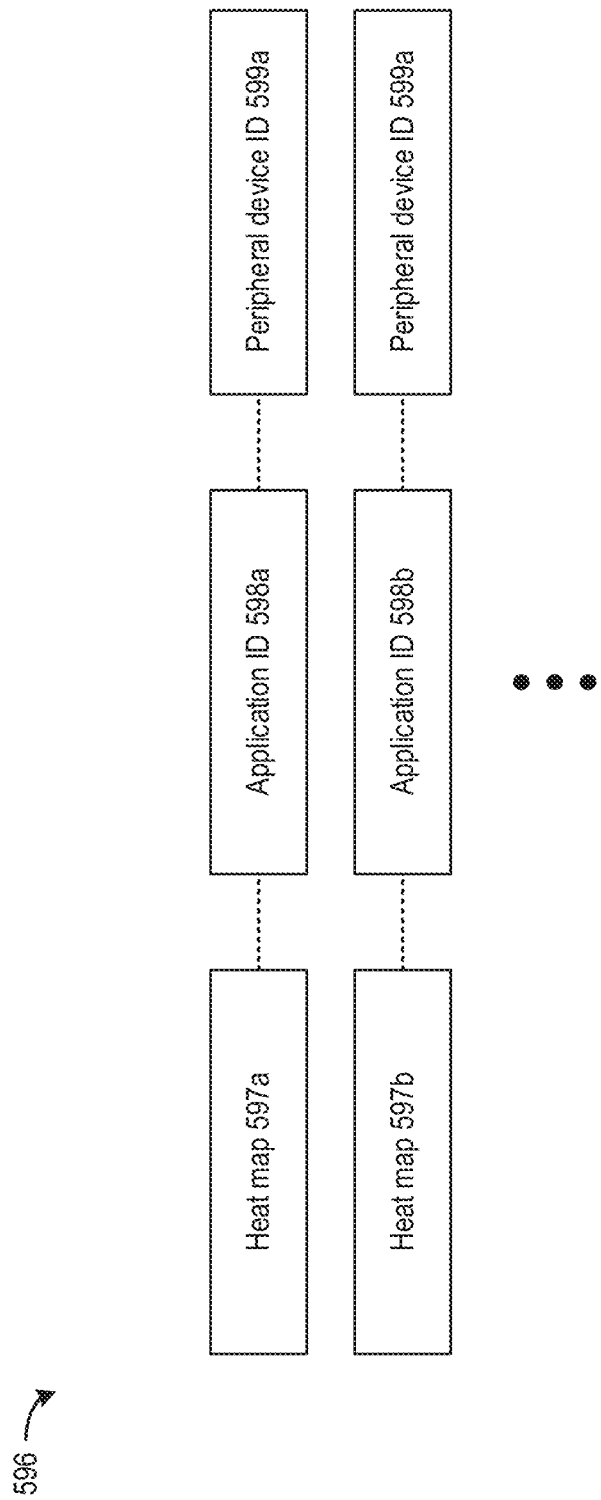

In some examples, as shown in FIG. 5F, a database 596 can be provided to store multiple heat maps/probability maps 597 (e.g., heat maps 597a, 597b, etc.). Each heat map/probability map can be associated with different attributes that affects a user's interaction with a peripheral device including, for example, an application for which the interaction took place, a type and a model of the peripheral device, etc. For example, a gaming application may cause a different pattern of user interactions with a keyboard than a word processing application, as described above. As another example, a keyboard and a joystick have different patterns of user interactions due to different modes of operations. Further, the same peripheral device (e.g., keyboard) but of different models may also have different patterns of user interactions due to, for example, different arrangements of keys. In database 596, the heat maps/probability maps can be organized based on different application identifiers 598 (e.g., application identifiers 598a, 598b, etc.), which can identify different applications, and based on different peripheral device identifiers 599 (e.g., peripheral device identifiers 599a, 599b, etc.), which can identify different types and models of peripheral devices. To perform segmentation, a heat map/probability map can be retrieved from database 596 based on the application for which the user interacts with the peripheral device, and/or based on the type and model of the peripheral device. With such arrangements, the correct heat map/probability map can be used to perform the hand segmentation (or the segmentation of other body parts), which can improve the accuracy of segmentation.

By adapting hand segmentation based on a distribution of actions on the peripheral device, the hand segmentation scheme can be less susceptible to other factors that can degrade the accuracy of hand detection, such as skin tone, light intensity, etc. As a result, a more robust segmentation scheme that can accurately identify hand pixels for a wider range of skin tones and in a wider range of environments can be achieved.

System

Figure 6:
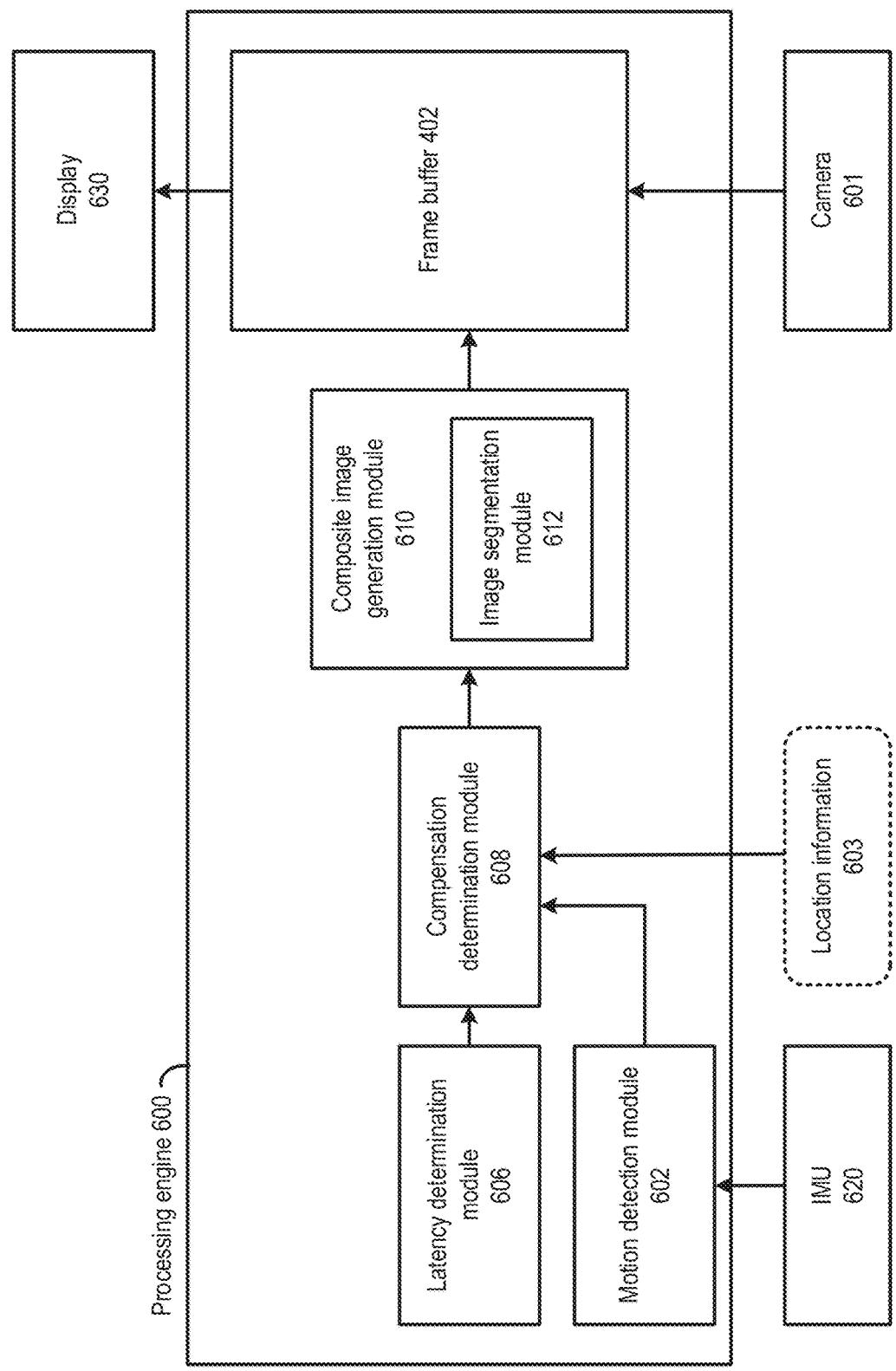
FIG. 6 illustrates an example of an image processing engine, according to some embodiments.

FIG. 6 illustrates an example of a processing engine 600 that can be part of HMD 160 and can be configured to generate composite images to provide an immersive AR/MR interactive experience. In some examples, processing engine 600 can be software instructions executable on a hardware processor of HMD 160. In some examples, processing engine 500 can also include logic circuits implemented in an application-specific integrated circuit (ASIC), a field-programmable gate array (FPGA), etc. As shown in FIG. 6, processing engine 600 can include a motion detection module 602, a latency determination module 606, a compensation determination module 608, a composite image generation module 610 which includes an image segmentation module 612, and frame buffer 402 of FIG. 4. Although FIG. 6 shows processing engine 600 as a single entity, it is understood that the components of processing engine 600 can be distributed across different entities. For example, composite image generation module 610 can be at a remote computer and receive image data and sensor data from an HMD, generate the composite image, and transmit the composite image back to the HMD for display.

Motion detection module 602 can receive an indication of a motion of HMD 160, as well as measurements of speed and direction (e.g., angular speed, rotational direction, etc.) of HMD 160, from IMU 620 of HMD 160. In addition, latency determination module 506 can determine a processing delay in the capturing and processing of camera image 170 from camera 601 of HMD 160, based on the techniques described above. As an example, latency determination module 606 can obtain the time when camera 601 captures camera image 170 based on content of camera image 170 (e.g., camera image 170 includes an image of a clock, a time-varying pattern emitted by an object, etc.) as a first time, record a second time when camera image 170 is stored in frame buffer 402 and available for composite image generation, and determine the processing delay based on a difference between the first time and the second time.

Compensation determination module 608 can determine, for example, the shift vector $V_S$ based on the angular speed information and the processing delay information which can be used to compute rotational angle α based on, for example, multiplying the angular speed and the processing delay. The shift vector can also be determined based on location coordinates information 602 of HMD 160 and reference object 340. The location coordinates information 603 can be obtained from or be based on, for example, measurements provided by a sensor pod attached to reference object 340, light sensors that detect light emitted by reference object 340, etc., as described above. The determination of shift vector $V_S$ can be triggered by an indication of a motion of HMD 160 from motion detection module 602. If the motion is detected after image 170 is captured, compensation determination module 608 can use the shift vector $V_S$ information to determine a direction of shift and a distance of shift, and use direction/distance information to change the location of display area 404 in frame buffer 402, or directly shift image 170 within frame buffer 402, to generate second image 410, and provide second image 410 to composite image generation module 610.

Composite image generation module 610 includes image segmentation module 612 which can perform segmentation of second image 410 based on techniques disclosed above. For example, the segmentation can be performed to distinguish pixels of a user's hand/fingers (or other body parts) from the pixels of a peripheral device operated by the user. The segmentation can be based on comparing the pixels of second image 410 against one or more thresholds determined based on, for example, a distribution of interactions with the peripheral device. The one or more thresholds can also be adapted for the user (e.g., based on the skin color/tones of the user, features of the user's finger nails, finger segments, etc.) as well as the operation condition (e.g., an ambient light intensity). Based on the segmentation result, pixels of the peripheral device or pixels of the user's body part can be extracted. In some examples, composite image generation module 610 may place the extracted pixels into a composite image depicting a virtual environment to represent a virtual interaction. Composite image generation module 610 may also generate the composite image from the first image based on replacing the extracted pixels with pixels of a virtual object (e.g., virtual hand/fingers). The extracted pixels and/or the virtual environment can also be modified to harmonize each other. For example, the luminance of the extracted pixels of the user's body part can be adjusted to match the lighting condition of the virtual environment. As another example, virtual shadows cast by the hand (represented by the extracted pixels) onto a virtual peripheral device can also be added to the composite image. In some examples, additional pixels of the virtual environment can also be replaced by hand/fingers pixels to fill in the gaps in the extraction of the hand/fingers pixels. The composite image can then be provided to display 530 of HMD 160 to be displayed to the user.

Method

Figure 7:
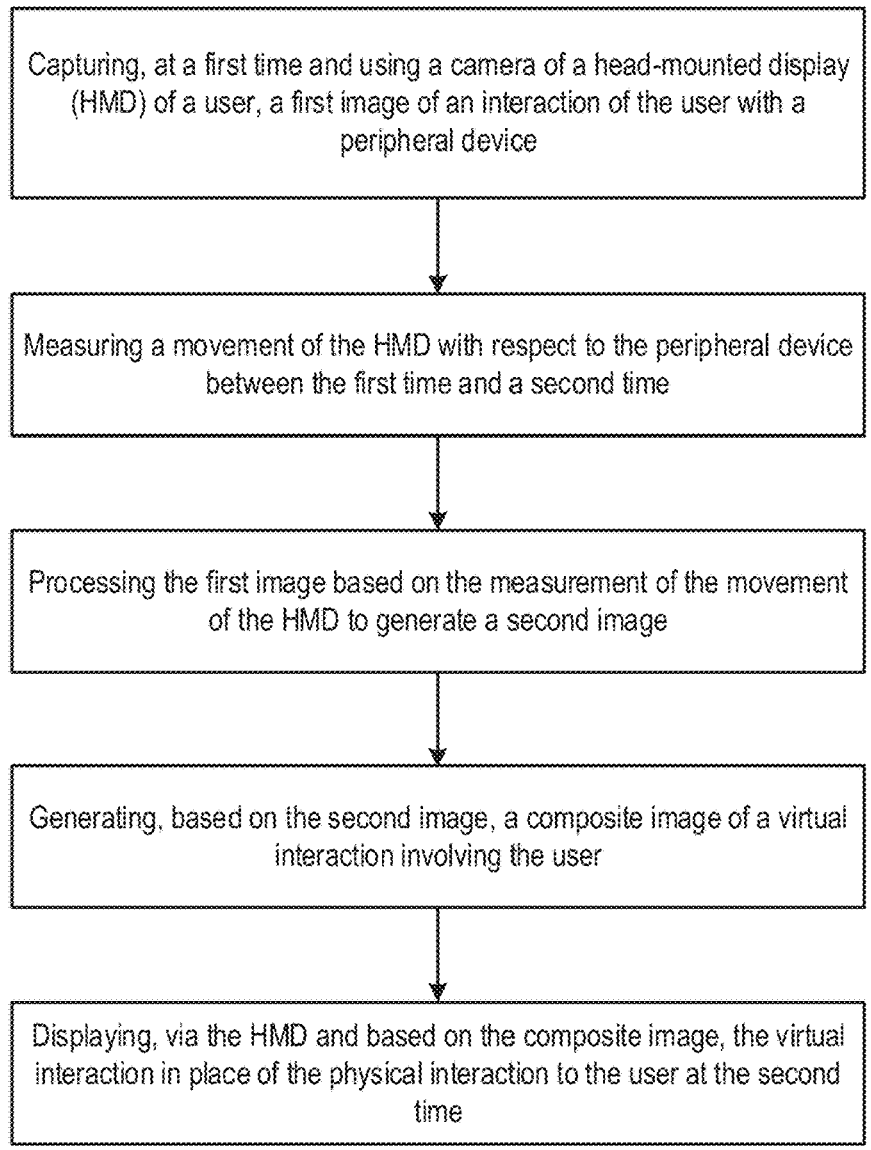
FIG. 7 illustrates a flow chart of an example method of providing mixed reality (MR) experience, according to some embodiments.

FIG. 7 shows a simplified flow diagram of a method 700 for providing a mixed reality (MR) interaction. Method 700 can be performed by, for example, an HMD in conjunction with processing engine 600 of FIG. 6 based on the techniques described above.

Method 700 starts with step 702, in which camera 601 of a HMD of the user can capture a first image of an interaction of the user with a physical object. The physical object may include, for example, a physical keyboard, and the interaction may include the user's fingers typing on the physical board.

In step 704, processing engine 600 can measure a movement of the HMD with respect to the physical object between the first time and a second time. For example, as described above, motion detection module 602 can receive an indication of a motion of HMD 160, as well as measurements of speed and direction (e.g., angular speed, rotational direction, etc.) of HMD 160, from IMU 620 of HMD 160. In addition, latency determination module 506 can determine a processing delay in the capturing and processing of camera image 170 from camera 601 of HMD 160, based on the techniques described above. As an example, latency determination module 606 can obtain the time when camera 601 captures the first image based on content of camera image 170 (e.g., the first image includes an image of a clock, a time-varying pattern emitted by an object, etc.) as a first time, record a second time when the first image is stored in frame buffer 402 and available for composite image generation, and determine the processing delay based on a difference between the first time and the second time. In addition, compensation determination module 608 can determine, for example, the shift vector $V_S$ based on the angular speed information and the processing delay information which can be used to compute rotational angle α based on, for example, multiplying the angular speed and the processing delay. The shift vector can also be determined based on location coordinates information 602 of HMD 160 and reference object 340. The location coordinates information 603 can be obtained from or be based on, for example, measurements provided by a sensor pod attached to reference object 340, light sensors that detect light emitted by reference object 340, etc., as described above. The determination of shift vector $V_S$ can be triggered by an indication of a motion of HMD 160 from motion detection module 602.

In step 706, processing engine 600 can process the first image based on the measurement of the movement of the HMD to generate a second image. For example, If the motion is detected after the first image is captured, compensation determination module 608 can use the shift vector $V_S$ information to determine a direction of shift and a distance of shift, and use direction/distance information to change the location of display area 404 in frame buffer 402, or directly shift image 170 within frame buffer 402, to generate the second image.

In step 708, processing engine 600 can generate, based on the second image, a composite image of a virtual interaction involving the user. For example, composite image generation module 610 can extract pixels of the peripheral device or pixels of the user's body part (e.g., hand, fingers, etc.). In some examples, composite image generation module 610 may place the extracted pixels into a composite image depicting a virtual environment to represent a virtual interaction. Composite image generation module 610 may also generate the composite image from the first image based on replacing the extracted pixels with pixels of a virtual object (e.g., virtual hand/fingers). The extracted pixels and/or the virtual environment can also be modified to harmonize each other. For example, the luminance of the extracted pixels of the user's body part can be adjusted to match the lighting condition of the virtual environment. As another example, virtual shadows cast by the hand (represented by the extracted pixels) onto a virtual peripheral device can also be added to the composite image. In some examples, additional pixels of the virtual environment can also be replaced by hand/fingers pixels to fill in the gaps in the extraction of the hand/fingers pixels.

In step 710, the composite image can then be provided to display 530 of HMD 160 to be displayed to the user in place of the physical interaction. The displaying can be at substantially the same time as the physical interaction, to provide a mixed-reality experience.

Figure 8:
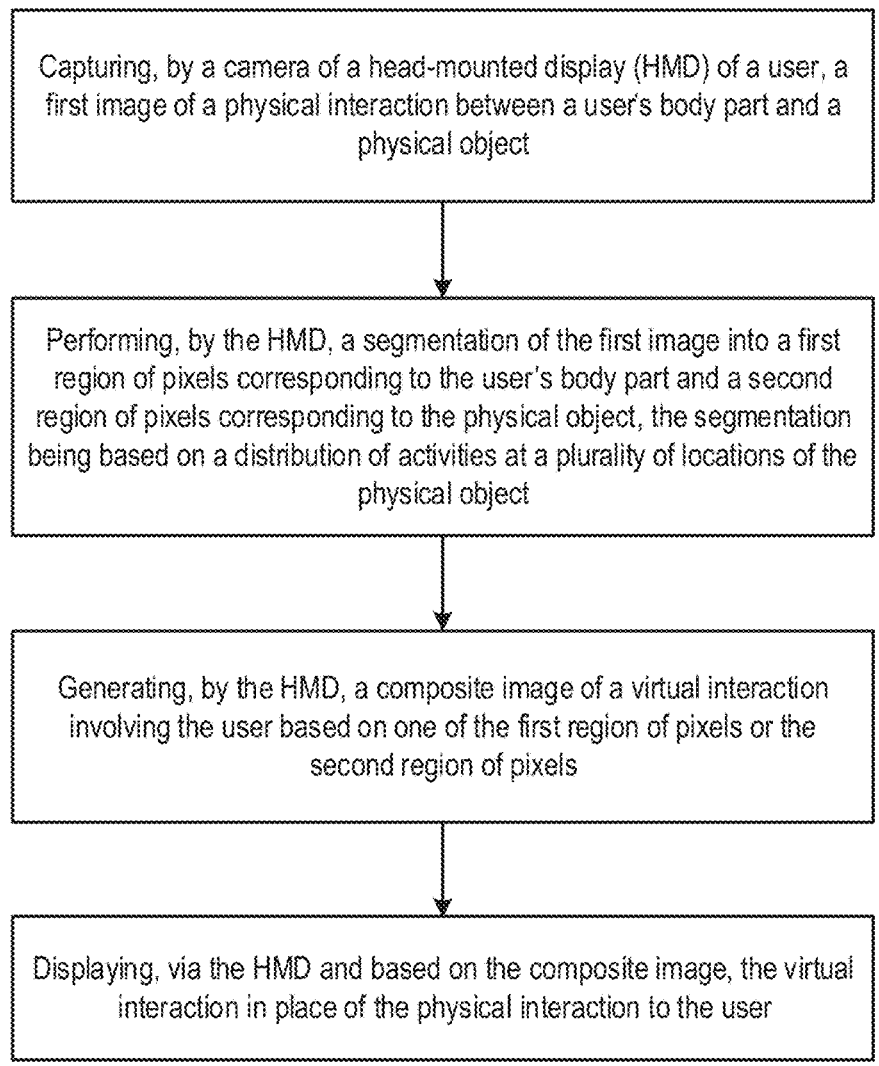
FIG. 8 illustrates a flow chart of an example method of providing MR experience, according to some embodiments.

FIG. 8 shows a simplified flow diagram of a method 800 for providing a mixed reality (MR) interaction. Method 800 can be performed by, for example, an HMD in conjunction with processing engine 600 of FIG. 6 based on the techniques described above.

Method 800 starts with step 802, in which a first image of a user's appendage and a physical peripheral input device is captured. The first image can be captured by, for example, camera 601 of an HMD. The user's appendage may cover at least a part of the physical peripheral input device. The first image can depict a physical interaction between the user's appendage and the physical peripheral input device. The appendage may include, for example, a hand, fingers, etc. The physical peripheral input device may include, for example, a keyboard, a mouse, etc.

In step 804, processing engine 600 can perform a segmentation of the first image into a first region of pixels corresponding to the user's appendage, wherein a second region of pixels corresponds to the physical peripheral input device. In some embodiments, the segmentation can be based on comparing the pixels of the first image against one or more thresholds determined based on, for example, a distribution of interactions with the physical peripheral input device. The distribution of interactions can include a historical distribution of interactions (from the user or from a group of users), an instantaneous distribution of interactions by the user, or a combination of both. The one or more thresholds can also be adapted for the user (e.g., based on the skin color/tones of the user, features of the user's finger nails, finger segments, etc.) as well as the operation condition (e.g., an ambient light intensity), based on the techniques described above. Based on the segmentation result, pixels of the peripheral device or pixels of the user's body part can be extracted.

In step 806, processing engine 600 can generate a composite image from the first image based on rendering, in place of the second region of pixels, pixels representing a virtual peripheral input device, such that the virtual peripheral input device appears in the composite image as at a same spatial location as the physical peripheral input device and covered at least partially by the user's appendage. For example, in a case where a first image captures the user typing on a physical keyboard, the composite image can include a virtual keyboard at the same spatial location as the physical keyboard, to provide an impression to the user that the user is typing on the virtual keyboard instead of the physical keyboard.

In step 808, the composite image can be displayed to the user via, for example, display 630. The composite image can be displayed at substantially the same time as the physical interaction, to provide the user with a mixed-reality experience.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A method of providing a mixed reality (MR) interaction, comprising:
    capturing a first image of a user's appendage and an electronic input device, wherein the user's appendage covers at least a part of the electronic input device;
    determining one or more intensity thresholds based on a distribution of activities of the user's appendage at a plurality of locations of the electronic input device, and histograms of color components at one or more of the plurality of locations of the electronic input device in a second image;
    performing, based on comparing pixel data of the first image against the one or more intensity thresholds, a segmentation of the first image into a first region of pixels corresponding to the user's appendage, wherein a second region of pixels corresponds to the electronic input device;
    generating a composite image from the first image based on rendering, in place of the second region of pixels, pixels representing a virtual device, such that the virtual device appears in the composite image as at a same spatial location as the electronic input device and covered at least partially by the user's appendage; and
    displaying the composite image to the user.

2. The method of claim 1, wherein the composite image is displayed to the user when the user's appendage covers the at least a part of the electronic input device.

3. The method of claim 1, wherein the segmentation of the first image comprises:
    determining a historical distribution of the activities at the plurality of locations of the electronic input device, the historical distribution of the activities being based on prior interactions between the user or a group of users with the electronic input device;
    determining the one or more intensity thresholds based on the historical distribution of the activities;
    comparing the pixels of the first image against the one or more intensity thresholds; and
    determining the first region of pixels corresponding to the user's appendage and the second region of pixels corresponding to the electronic input device based on results of the comparison of the pixels of the first image against the one or more intensity thresholds.

4. The method of claim 3, wherein the segmentation of the first image comprises:
    determining, based on statistical analysis of the historical distribution of the activities, a distribution of likelihoods of the user's appendage being at each location of the plurality of locations of the electronic input device;
    identifying, based on the distribution of likelihoods, pixels that are likely to be part of the user's appendage; and
    determining the one or more intensity thresholds based on one or more attributes of the identified pixels.

5. The method of claim 4, further comprising:
    determining a first intensity threshold of the one or more intensity thresholds corresponding to a first region of the user's appendage;

determining a second intensity threshold of the one or more intensity thresholds corresponding to a second region of the user's appendage; and
comparing the pixels of the first image against the first intensity threshold and the second intensity threshold to determine the first region of pixels corresponding to the user's appendage.

6. The method of claim 5, further comprising: determining at least one of the first intensity threshold or the second intensity threshold based on at least one of: an ambient light intensity, or an identity of the user.

7. The method of claim 1, wherein the distribution of activities comprises an instantaneous distribution of activities at the plurality of locations of the electronic input device when the user operates the electronic input device.

8. The method of claim 7, further comprising:
receiving, from a sensor at a first location of the electronic input device, an indication of receiving an activity;
based on the indication, capturing the second image of the electronic input device;
selecting, from the second image, a third region of pixels corresponding to the first location and a fourth region of pixels around the first location;
determining a first histogram of the histograms of the color components for the third region of pixels;
determining a second histogram of the histograms of the of color components for the fourth region of pixels;
determining the one or more intensity thresholds based on the first histogram and the second histogram; and
comparing pixels of the first image against the one or more intensity thresholds to determine the first region of pixels of the first image corresponding to the user's appendage.

9. The method of claim 8, further comprising:
identifying, based on a historical distribution of activities, a second location of the electronic input device that receives fewer than a pre-determined number of prior activities;
identifying, from the second image, a fifth region of pixels corresponding to the second location;
determining a third histogram of the histograms of the color components for the fifth region of pixels;
determining a second intensity threshold of the one or more intensity thresholds based on the third histogram; and
comparing the pixels of the first image against the second intensity threshold to determine the second region of pixels of the first image corresponding to the electronic input device.

10. The method of claim 1, further comprising:
determining a change in the distribution of the activities with respect to time;
determining a region of interest based on the change;
identifying pixels in the region of interest of the first image; and
determining the first region of pixels corresponding to the user's appendage from the identified pixels.

11. The method of claim 1, further comprising:
capturing the second image of the electronic input device unoccluded by the user's appendage;
determining the one or more intensity thresholds based on the second image;
transmitting an indication to the user to put the user's appendage at pre-determined locations of the electronic input device;
capturing a third image of the user's appendage at the pre-determined locations of the electronic input device;

adjusting the one or more intensity thresholds based on pixels of the third image corresponding to the pre-determined locations of the electronic input device; and
comparing the pixels of the first image against the adjusted one or more intensity thresholds to determine the first region of pixels corresponding to the user's appendage.

12. The method of claim 1, wherein the distribution of the activities is determined from a plurality of distributions of activities based on at least one of: a model of the electronic input device, or an application for which the user interacts with the electronic input device.

13. The method of claim 1, wherein the composite image is generated based on replacing pixels corresponding to a physical environment in which the electronic input device is located with pixels representing a virtual environment in which the virtual device is located.

14. The method of claim 13, wherein the composite image is generated based on adjusting a luminance of the first region of pixels based on a luminance of the virtual environment.

15. The method of claim 1, wherein the first image is captured by a camera of a head mounted display (HMD); and
wherein the composite image is displayed by the HMD.

16. The method of claim 1, wherein the segmentation of the first image into the first region of pixels corresponding to the user's appendage includes identifying two or more intensity thresholds that represent the user's appendage; and
wherein pixels of the first image that do not fall within the two or more intensity thresholds are discarded.

17. The method of claim 1, wherein performing, based on pixel data of the first image and a distribution of activities of the user's appendage at a plurality of locations of the electronic input device, a segmentation of the first image into a first region of pixels corresponding to the user's appendage comprises at least one of a first operation or a second operation;
wherein the first operation comprises:
comparing the pixel data at each pixel location of the first image against the one or more intensity thresholds for the pixel location to generate a comparison result for the pixel location, the one or more intensity thresholds being based on pixel data reflecting a skin color of the appendage and a scaling factor reflecting a measurement of the activities at the pixel location; and
determining whether the pixel data at the pixel location belong to the user's appendage based on the comparison result for the pixel location;
and wherein the second operation comprises:
comparing the pixel data at each pixel location of the first image against the one or more intensity thresholds for the pixel location to generate a second comparison result, the one or more intensity thresholds being based on pixel data reflecting a skin color of the appendage;
determining, based on a measurement of the activities at each pixel location, whether the pixel location likely corresponds to the user's appendage; and
determining whether the pixel data at the pixel location belong to the user's appendage based on the second comparison result and based on whether the measurement at the pixel location indicates that the pixel location likely corresponds to the user's appendage.

18. The method of claim 1, wherein electronic input device comprises at least one of: a keyboard, a mouse, or a joystick.

19. An apparatus comprising:
a display device;
a camera configured to capture a first image of a user's appendage and a electronic input device, wherein the user's appendage covers at least a part of the electronic input device; and
an image processor coupled with the camera and with the display device and configured to:
receive the first image from the camera;
determine one or more intensity thresholds based on a distribution of activities of the user's appendage at a plurality of locations of the electronic input device, and histograms of color components at one or more of the plurality of locations of the electronic input device in a second image;
perform, based on comparing pixel data of the first image against the one or more intensity thresholds, a segmentation of the first image into a first region of pixels corresponding to the user's appendage, wherein a second region of pixels corresponds to the electronic input device;
generate a composite image from the first image based on rendering, in place of the second region of pixels, pixels representing a virtual device, such that the virtual device appears in the composite image as at a same spatial location as the electronic input device and covered at least partially by the user's appendage; and
provide the composite image to the display device for displaying to the user.

20. A non-transitory, computer readable medium storing instructions that, when executed by a hardware processor, causes the hardware processor to:
receive, from a camera, a first image of a user's appendage and a electronic input device, wherein the user's appendage covers at least a part of the electronic input device;
determine one or more intensity thresholds based on a distribution of activities of the user's appendage at a plurality of locations of the electronic input device, and histograms of color components at one or more of the plurality of locations of the electronic input device in a second image;
perform, based on comparing pixel data of the first image against the one or more intensity thresholds, a segmentation of the first image into a first region of pixels corresponding to the user's appendage, wherein a second region of pixels corresponds to the electronic input device;
generate a composite image from the first image based on rendering, in place of the second region of pixels, pixels representing a virtual device, such that the virtual device appears in the composite image as at a same spatial location as the electronic input device and covered at least partially by the user's appendage; and
provide the composite image to a display device for displaying to the user.

* * * * *